United States Patent
Mizuta et al.

(10) Patent No.: US 11,040,284 B2
(45) Date of Patent: Jun. 22, 2021

(54) INFORMATION PROCESSING SYSTEM, STORAGE MEDIUM HAVING STORED THEREIN INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Masato Mizuta, Kyoto (JP); Maasa Miyoshi, Kyoto (JP); Mitsutoshi Kodama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/710,529

(22) Filed: Dec. 11, 2019

(65) Prior Publication Data

US 2021/0016175 A1     Jan. 21, 2021

(30) Foreign Application Priority Data

Jul. 16, 2019     (JP) .............................. JP2019-131177

(51) Int. Cl.
*A63F 13/54*     (2014.01)
*A63F 13/92*     (2014.01)
*G06F 3/01*     (2006.01)
*G06F 3/16*     (2006.01)

(52) U.S. Cl.
CPC .............. *A63F 13/54* (2014.09); *A63F 13/92* (2014.09); *G06F 3/011* (2013.01); *G06F 3/165* (2013.01)

(58) Field of Classification Search
None
See application file for complete search history.

(56) References Cited

U.S. PATENT DOCUMENTS

| | | | | |
|---|---|---|---|---|
| 10,870,047 | B1 * | 12/2020 | Kawamoto | ........ A63B 71/0622 |
| 2017/0216670 | A1 | 8/2017 | Kuroda et al. | |
| 2017/0262066 | A1 * | 9/2017 | Kawamura | ............. G06F 1/163 |
| 2017/0269636 | A1 * | 9/2017 | Song | .................... G06F 1/1652 |
| 2018/0301130 | A1 | 10/2018 | Kudoh | |

FOREIGN PATENT DOCUMENTS

| | | |
|---|---|---|
| JP | 6-301381 | 10/1994 |
| JP | 2011-123248 | 6/2011 |
| JP | 6444288 | 12/2018 |
| WO | 2016/059943 | 4/2016 |

OTHER PUBLICATIONS

Wii Music, Weekly Famitsu, Enterbrain Inc., Oct. 31, 2008, vol. 23, Issue 44, pp. 122-125 (5 pgs.).
Notice of Reasons for Refusal dated Dec. 24, 2019 in Japanese Patent Application No. 2019-131177 (4 pgs.) with English machine translation (5 pgs.).

* cited by examiner

*Primary Examiner* — Ronald Laneau
(74) *Attorney, Agent, or Firm* — Nixon & Vanderhye PC

(57) ABSTRACT

An example of an information processing system includes a ring controller that deforms by applying a force to the ring controller. When a push-in operation or a pull operation on the ring controller is performed, first BGM or second BGM is output, superimposed on basic BGM. Further, when the push-in operation or the pull operation is performed, and the orientation of the ring controller is changed, a filter process or a delay process is performed. Further, when the push-in operation or the pull operation is detected, an instrument sound is added in accordance with the orientation of the ring controller at this time.

20 Claims, 28 Drawing Sheets

F I G. 9
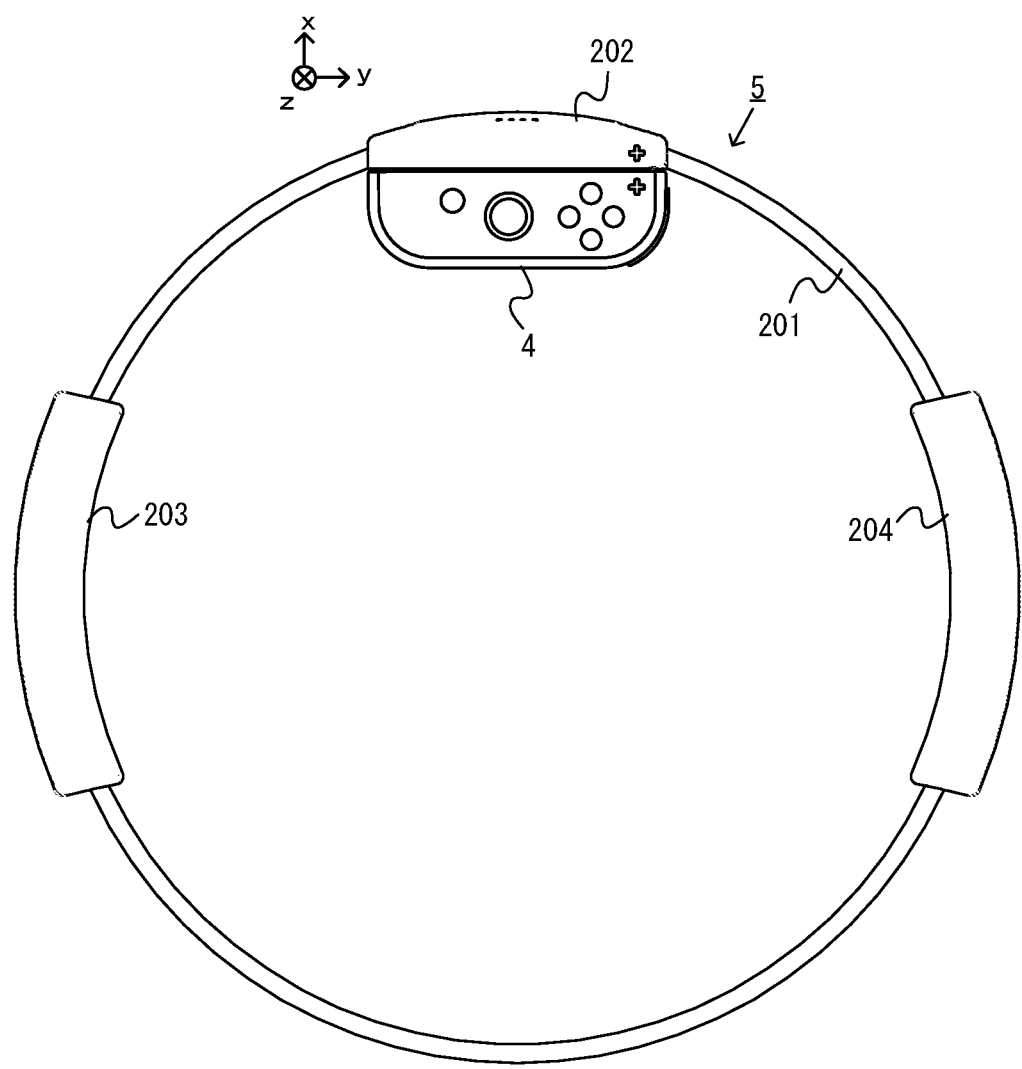

CAN BE ACCOMMODATED

PUSH-IN OPERATION

PULL OPERATION

F I G. 1 7
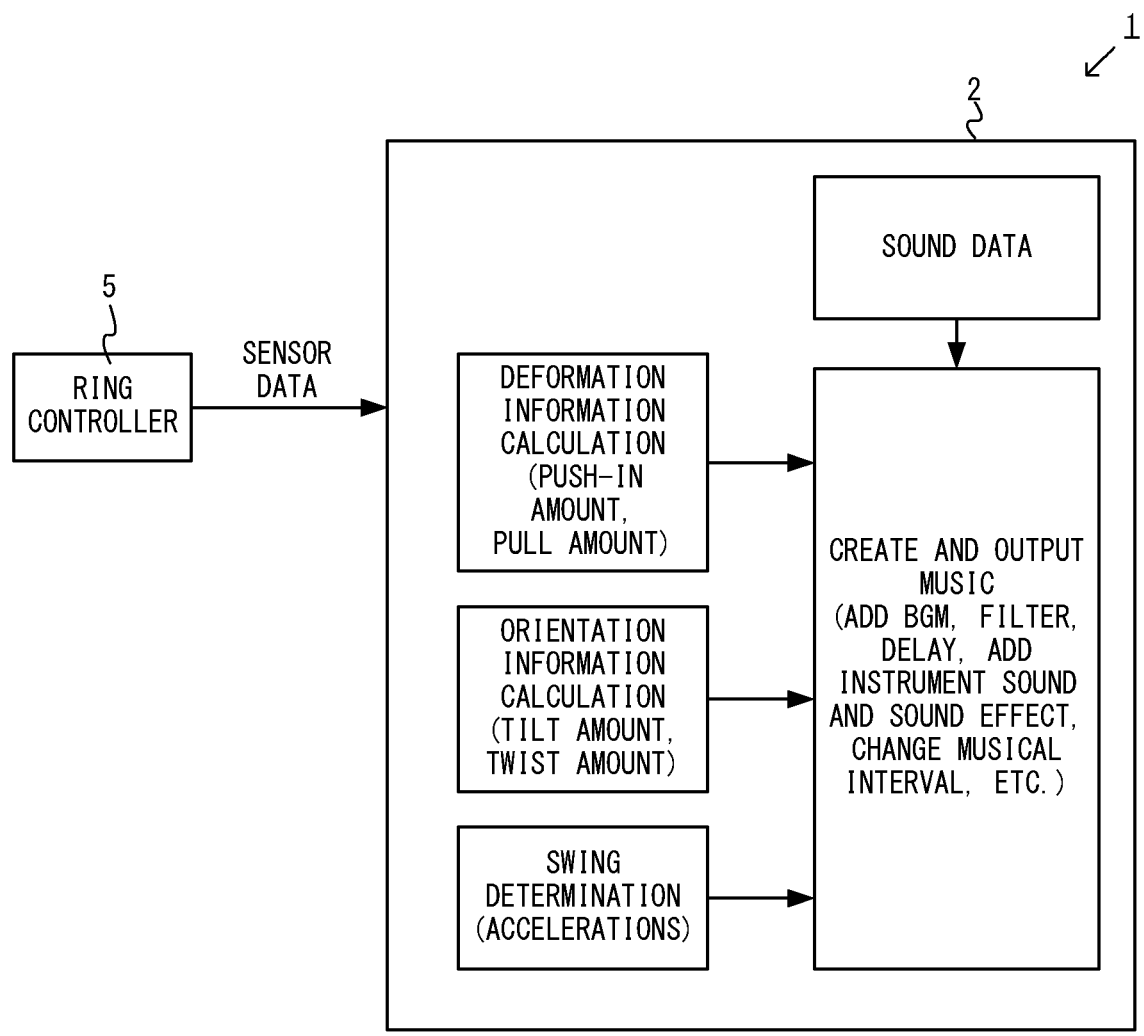

INFORMATION PROCESSING SYSTEM, STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

The disclosure of Japanese Patent Application No. 2019-131177, filed on Jul. 16, 2019, is incorporated herein by reference.

FIELD

The present disclosure relates to an information processing system, an information processing program, an information processing apparatus, and an information processing method that are capable of outputting a sound.

BACKGROUND AND SUMMARY

As a background, there is an electronic device that outputs a sound by changing the orientation of a controller.

In the background, however, there is room for improvement in outputting a sound by various operations on an input device.

Therefore, it is an object of an exemplary embodiment to provide an information processing system capable of outputting a sound by various operations on an input device.

To achieve the above object, the exemplary embodiment employs the following configurations.

An information processing system according to the exemplary embodiment includes an input device that deforms from a steady state by applying a force to the input device and at least one processor. The input device includes a sensor for providing output corresponding to the deformation of the input device. The at least one processor is configured to acquire deformation information corresponding to the deformation of the input device based on the output of the sensor. The at least one processor is configured to acquire orientation information corresponding to an orientation of the input device. The at least one processor is configured to output sound data based on the deformation information and the orientation information.

Based on the above, it is possible to output a sound based on deformation information and orientation information regarding an input device and output a sound based on a wide variety of operations on the input device. It should be noted that "acquire deformation information corresponding to the deformation of the input device based on the output of the sensor" may be the acquisition of output data itself of the sensor as the deformation information, or may be the acquisition of the result of a predetermined process (e.g., the conversion of the data format and/or a calculation process) on the output data of the sensor as the deformation information.

Further, the sound data may be obtained by applying a first acoustic effect based on the deformation information and the orientation information to basic sound data.

Based on the above, it is possible to apply a first acoustic effect to a basic sound based on the deformation information and orientation information. Consequently, it is possible to perform an operation on the input device, for example, in time with a basic sound. Thus, it is possible to apply an acoustic effect in accordance with this operation.

Further, a second acoustic effect based on the deformation information may be further applied to the sound data.

Based on the above, it is possible to further apply a second acoustic effect based on the deformation information in addition to the first acoustic effect based on both the deformation information and the orientation information.

Further, a third acoustic effect based on the orientation information may be applied to the second acoustic effect.

Based on the above, it is possible to apply a third acoustic effect based on the orientation information to the applied second acoustic effect.

Further, while the input device is deformed, the second acoustic effect may be continuously applied.

Based on the above, while the input device is deformed, the second acoustic effect is continuously applied. Thus, for example, it is possible to cause a user to continuously apply a force to the input device.

Further, the greater a deformation amount of the input device, the greater the second acoustic effect.

Based on the above, it is possible to change the magnitude of the second acoustic effect based on the deformation amount of the input device. For example, it is possible to set the sound volume of the second acoustic effect such that the greater the deformation of the input device, the greater the sound volume of the second acoustic effect.

Further, in a case where the input device deforms at a speed greater than a threshold, and when the input device returns from the deformed state to the steady state, a decrease in the second acoustic effect may be slower than in a case where the input device deforms at a speed smaller than the threshold.

Based on the above, when a parameter regarding the speed of the deformation is greater than a predetermined threshold, and even when the input device returns to a steady state, it is possible to delay a decrease in the second acoustic effect. Consequently, it is possible to provide a reverberation to the second acoustic effect.

Further, in accordance with the deformation of the input device from the steady state, a fourth acoustic effect may be further applied to the sound data.

Based on the above, it is possible to further apply a fourth acoustic effect in accordance with the deformation of the input device from a steady state.

Further, the fourth acoustic effect may be based on the orientation of the input device when the input device is deformed from the steady state.

Based on the above, based on the orientation of the input device when the input device deforms, it is possible to apply the fourth acoustic effect.

Further, the at least one processor may be further configured to detect that the input device is swung. When the input device is swung, a fifth acoustic effect based on the orientation information may be further applied to the sound data.

Based on the above, it is possible to further apply a fifth acoustic effect based on the swing of the input device.

Further, the input device may undergo first deformation by applying a force in a first direction to the input device and undergo second deformation by applying a force in a second direction different from the first direction to the input device. The first acoustic effect applied based on the first deformation may be different from the first acoustic effect applied based on the second deformation.

Based on the above, it is possible to apply a different acoustic effect depending on the direction in which the input device is deformed.

Further, when the input device deforms from the steady state, the sound data obtained by applying an acoustic effect corresponding to the orientation information may be output, and when the input device is in the steady state, the sound data obtained without applying the acoustic effect corresponding to the orientation information may be output.

Based on the above, when the input device deforms, it is possible to apply an acoustic effect corresponding to the orientation of the input device, and when the input device does not deform, it is possible to prevent the acoustic effect corresponding to the orientation of the input device from being applied. Consequently, it is possible to apply an acoustic effect by reflecting the intention of a user.

Further, when the input device deforms from the steady state, the sound data obtained by applying an acoustic effect corresponding to the orientation information to the basic sound data may be output, and when the input device is in the steady state, the basic sound data may be output regardless of the orientation information.

Based on the above, when the input device deforms, it is possible to apply an acoustic effect corresponding to the orientation of the input device to the basic sound, and when the input device does not deform, it is possible to output the basic sound regardless of the orientation of the input device. Consequently, it is possible to apply an acoustic effect to the basic sound by reflecting the intention of the user.

Further, the input device may include a ring-shaped portion, at least part of which can elastically deform.

Based on the above, by deforming the input device including a ring-shaped portion that can elastically deform, it is possible to output a sound.

Further, the input device may be held by a hand of a user. The information processing system may further include a second input device that detects a motion of a leg of the user. Then, the sound data may be output further based on a detection result of the motion of the leg of the user in addition to the deformation information and the orientation information.

Based on the above, it is possible to output a sound based on the motion of a leg in addition to the deformation of the input device by a hand.

Further, the sound data may be output based on a product of the deformation information and the orientation information.

Based on the above, it is also possible to output the same sound by various operations. Thus, it is possible to increase the degree of freedom in an operation of a user.

Further, another exemplary embodiment may be an information processing apparatus for executing processes of an information processing system, or may be an information processing program. Alternatively, another exemplary embodiment may be an information processing method performed by the information processing system.

According to the exemplary embodiment, it is possible to output a sound based on a wide variety of operations on an input device.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram showing a non-limiting example of a ring-shaped extension apparatus 5;

FIG. 17 is a diagram showing a non-limiting overview of the output of music based on the operations on the ring controller;

DETAILED DESCRIPTION OF NON-LIMITING EXAMPLE EMBODIMENTS

Figure 1:
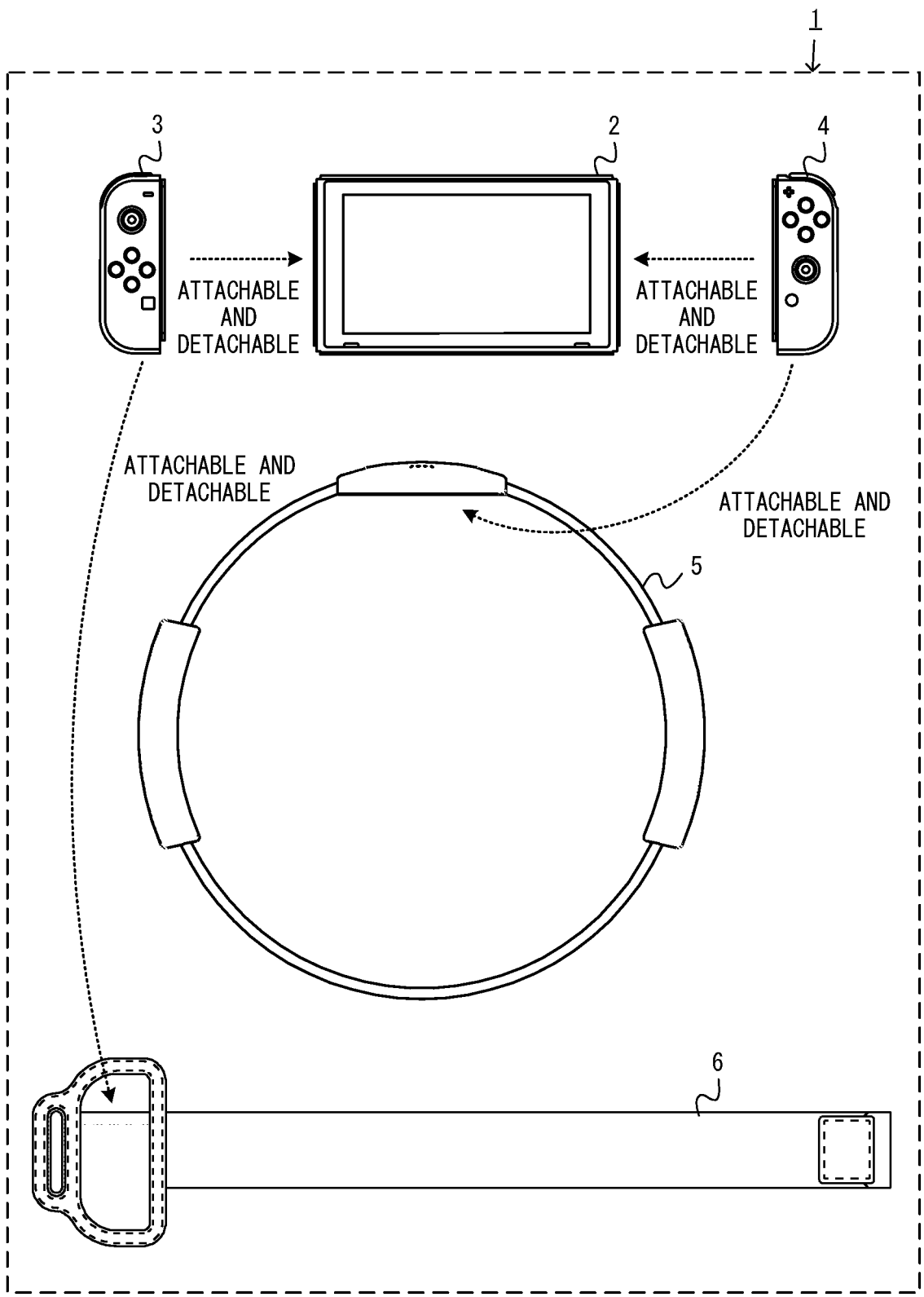
FIG. 1 is a diagram showing a non-limiting example of apparatuses included in a game system.

A game system according to an example of an exemplary embodiment is described below. FIG. 1 is a diagram showing examples of apparatuses included in the game system. As shown in FIG. 1, a game system 1 includes a main body apparatus 2, a left controller 3, a right controller 4, a ring-shaped extension apparatus 5, and a belt-shaped extension apparatus 6.

The main body apparatus 2 is an example of an information processing apparatus and functions as a game apparatus main body in the exemplary embodiment. Each of the left controller 3 and the right controller 4 is attachable to and detachable from the main body apparatus 2 (see FIGS. 1 and 3). That is, a user can use a unified apparatus obtained by attaching each of the left controller 3 and the right controller 4 to the main body apparatus 2 (see FIG. 2). Further, the user can also use the main body apparatus 2, the left controller 3, and the right controller 4 as separate bodies (see FIG. 3). It should be noted that hereinafter, main body apparatus 2 and the controllers 3 and 4 will be occasionally collectively referred to as a "game apparatus".

The ring-shaped extension apparatus 5 is an example of an extension apparatus used in the right controller 4. The ring-shaped extension apparatus 5 is used in the state where the right controller 4 is attached to the ring-shaped extension apparatus 5. Further, the belt-shaped extension apparatus 6 is an example of an extension apparatus used in the left controller 3. The belt-shaped extension apparatus 6 is used in the state where the left controller 3 is attached to the belt-shaped extension apparatus 6. As described above, in the exemplary embodiment, the user can also use the controllers 3 and 4 in the state where the controllers 3 and 4 are attached to the respective extension apparatuses (see FIG. 12). It should be noted that not only the right controller 4 but also to the left controller 3 may be attachable to the ring-shaped extension apparatus 5. Not only the left controller 3 but also the right controller 4 may be attachable to the belt-shaped extension apparatus 6. Using these extension apparatuses, it is possible to extend or change the functions and the use forms of the controllers. It should be noted that these extension apparatuses can be referred to simply as "peripheral devices".

Figure 2:
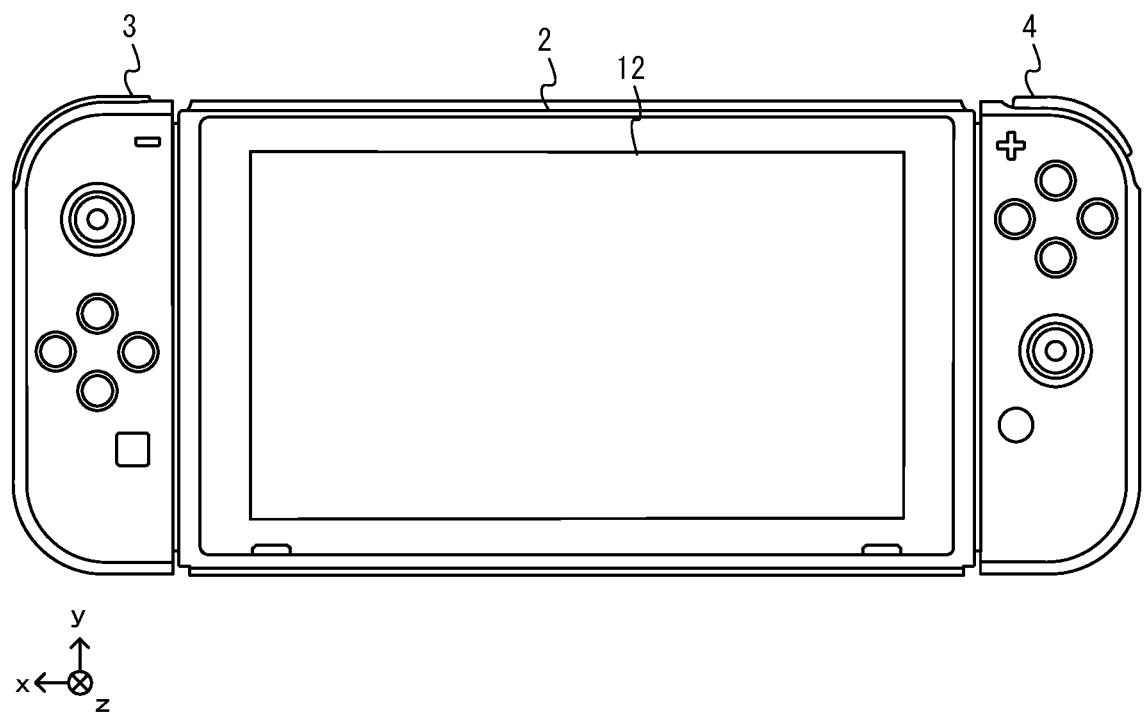
FIG. 2 is a diagram showing a non-limiting example of the state where a left controller 3 and a right controller 4 are attached to a main body apparatus 2.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
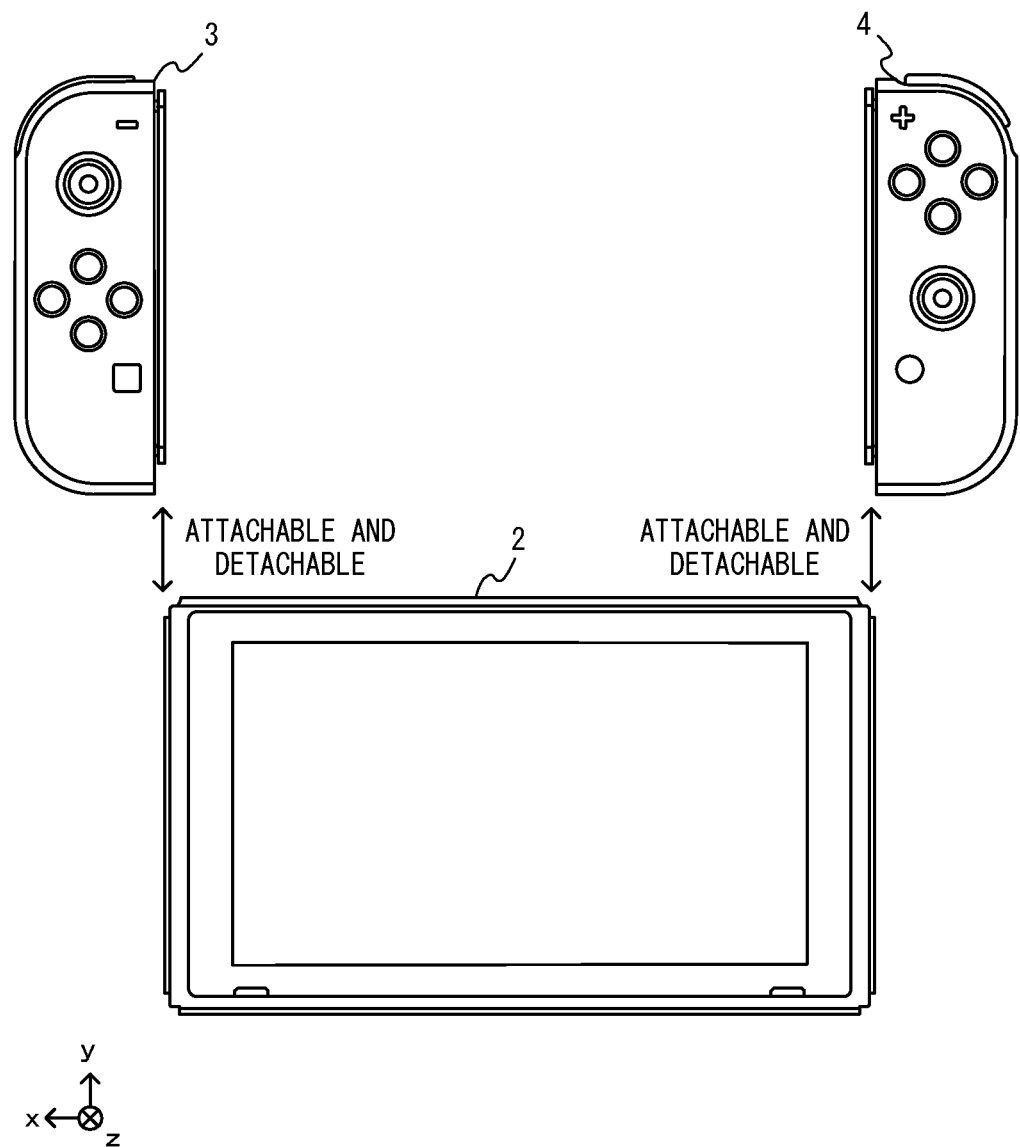
FIG. 3 is a diagram showing a non-limiting example of the state where each of the left controller 3 and the right controller 4 is detached from the main body apparatus 2.

FIG. 3 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 4:
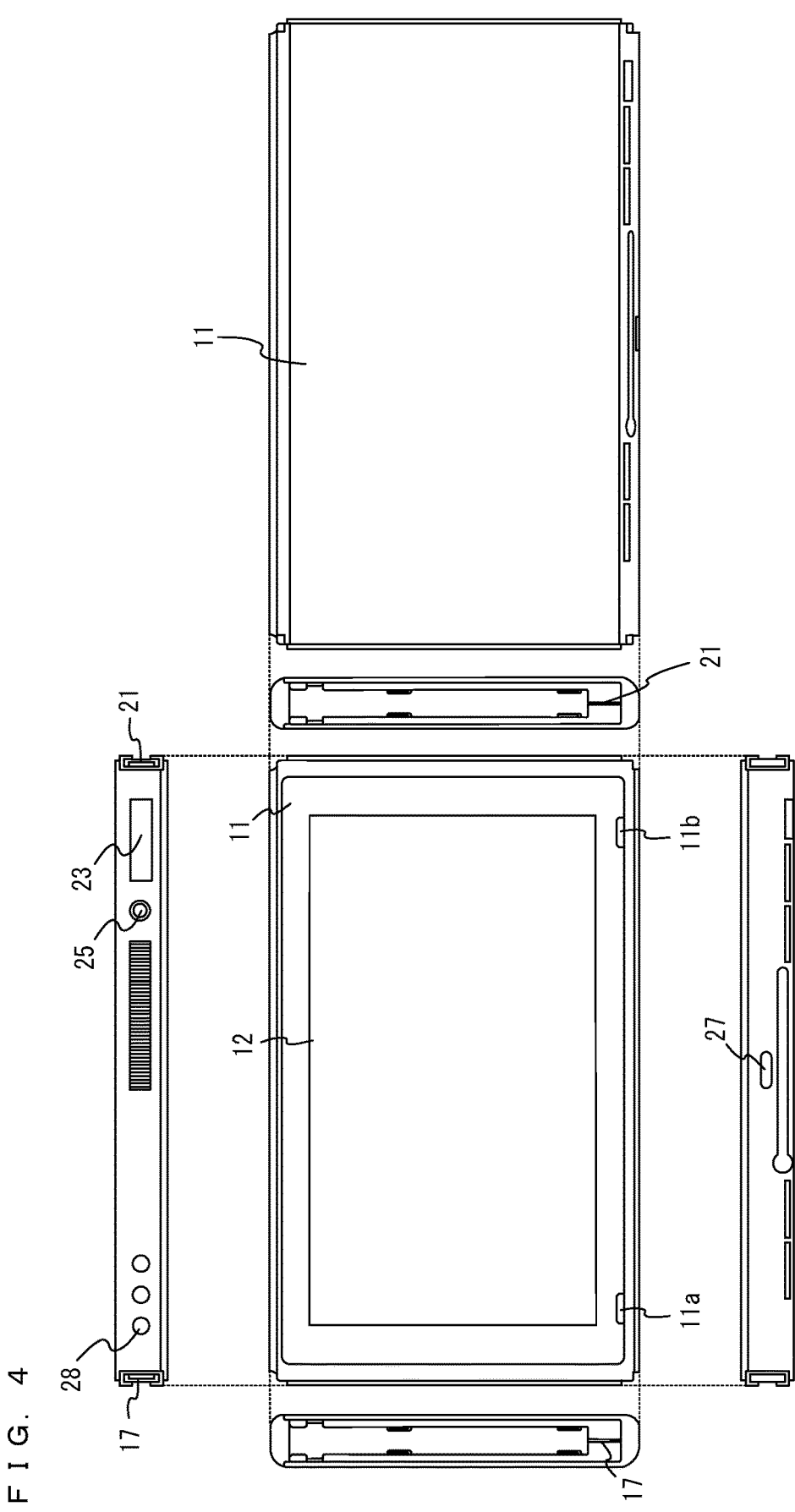
FIG. 4 is six orthogonal views showing a non-limiting example of the main body apparatus 2.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes speakers (i.e., speakers 88 shown in FIG. 7) within the housing 11. As shown in FIG. 4, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 5:
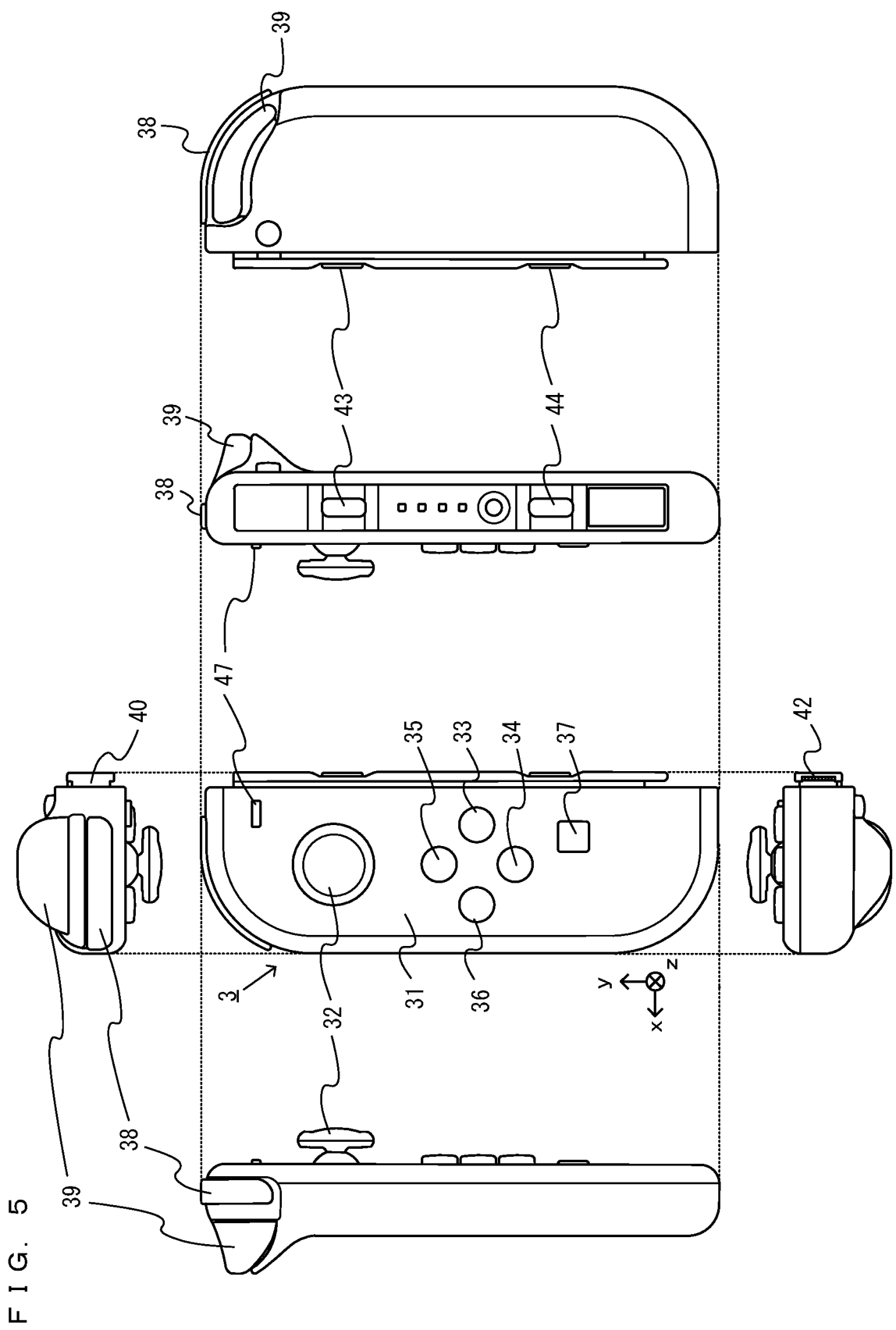
FIG. 5 is six orthogonal views showing a non-limiting example of the left controller 3.

FIG. 5 is six orthogonal views showing an example of the left controller 3. As shown in FIG. 5, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 5, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 6:
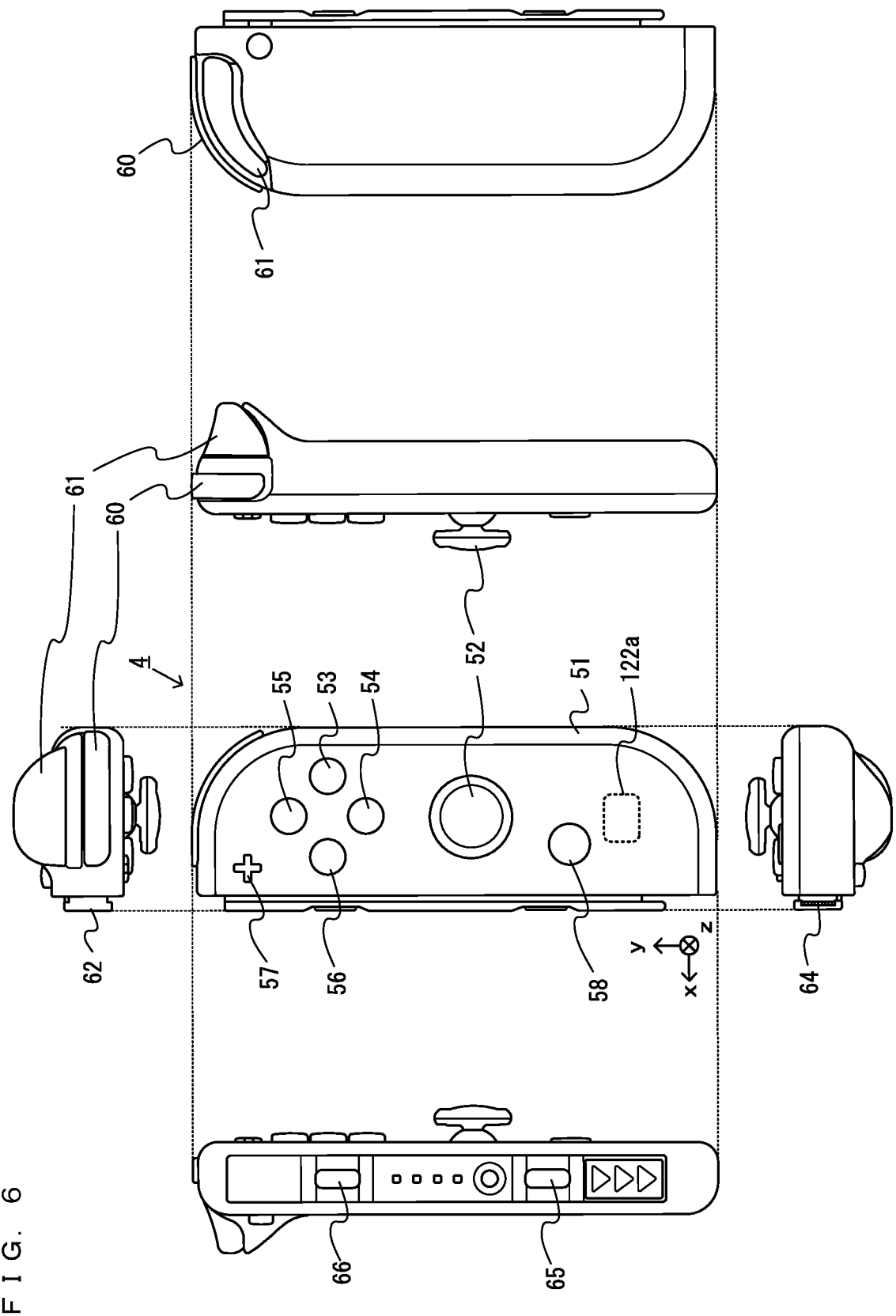
FIG. 6 is six orthogonal views showing a non-limiting example of the right controller 4.

FIG. 6 is six orthogonal views showing an example of the right controller 4. As shown in FIG. 6, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 7:
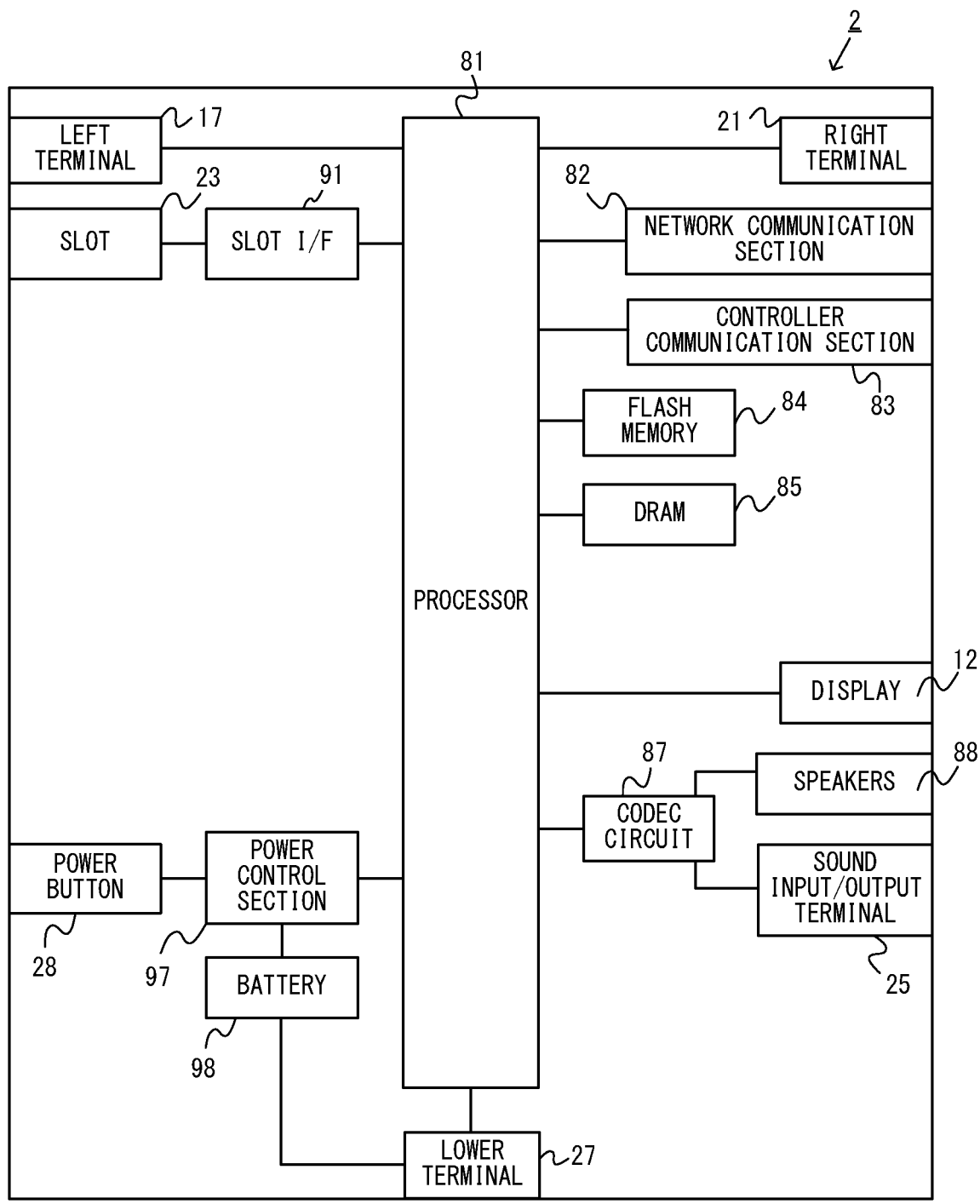
FIG. 7 is a block diagram showing a non-limiting example of the internal configuration of the main body apparatus 2.

FIG. 7 is a block diagram showing an example of the internal configuration of the main body apparatus 2. The main body apparatus 2 includes components 81 to 91, 97, and 98 shown in FIG. 7 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 7, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 8:
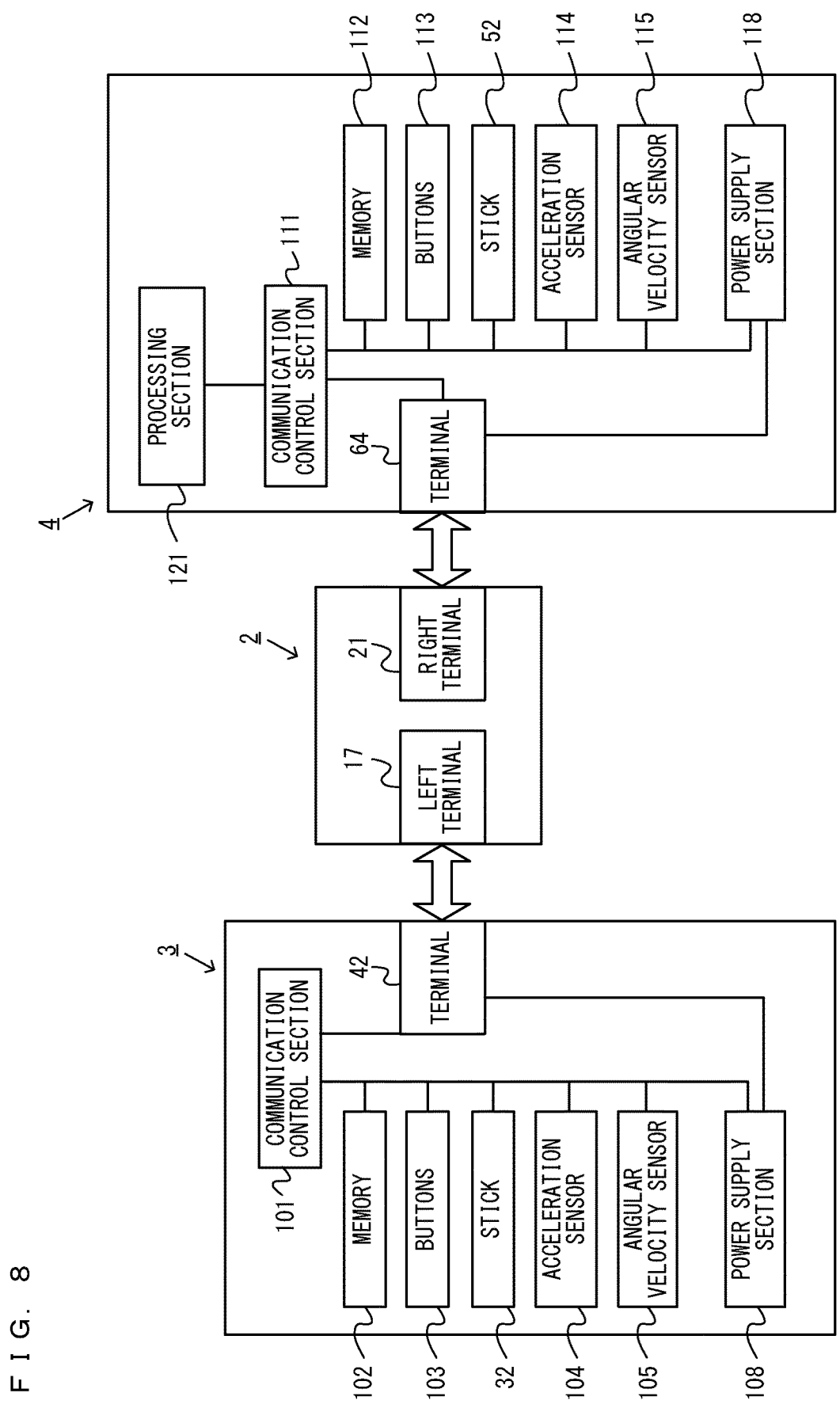
FIG. 8 is a block diagram showing a non-limiting example of the internal configurations of the main body apparatus 2 and the left controller 3 and the right controller 4.

FIG. 8 is a block diagram showing examples of the internal configurations of the main body apparatus 2, the left controller 3, and the right controller 4. It should be noted that the details of the internal configuration of the main body apparatus 2 are shown in FIG. 7 and therefore are omitted in FIG. 8.

The left controller 3 includes a communication control section 101, which communicates with the main body apparatus 2. As shown in FIG. 8, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 8) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 5) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 5). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 8, the power control circuit is connected to the battery and also connected to components of the left controller 3 (specifically, components that receive power supplied from the battery).

As shown in FIG. 8, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a processing section 121. The processing section 121 is connected to the communication control section 111.

Further, the processing section 121 includes a CPU, a memory, and the like. Based on a predetermined program (e.g., an application program for various calculations) stored in a storage device (e.g., a non-volatile memory or the like) (not shown) included in the right controller 4, and in accordance with a command from the main body apparatus 2, the processing section 121 performs a process. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

FIG. 9 is a diagram showing an example of a ring-shaped extension apparatus. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 9, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 (see FIG. 6) of the right controller 4. The slider 62 is inserted into a rail member in a predetermined linear direction (i.e., a slide direction), whereby the rail member engages with the slider 62 in the state where the slider 62 can move sliding in the linear direction relative to the rail member. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the right controller 4 includes a latch portion 63 (see FIG. 6). The latch portion 63 is provided so as to protrude sideways (i.e., the z-axis positive direction shown in FIG. 6) from the slider 62. While the latch portion 63 is allowed to move into the slider 62, the latch portion 63 is urged (e.g., by means of a spring) into the position described above in which the latch portion 63 is protruding sideways. The rail portion is provided with a notch. The latch portion 63 latches the notch in the state where the slider 62 is inserted into the back of the rail portion. As the latch portion 63 engages with the notch while the rail portion is in engagement with the slider 62, the right controller 4 is attached to the main portion 202.

Note that the right controller 4 includes the release button 69 that can be pressed (see FIG. 6). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 9, the ring-shaped extension apparatus 5 includes grip covers 203 and 204. The grip covers 203 and 204 are components to be held by the user. In the present embodiment, the grip covers 203 and 204 can be removed from the ring-shaped portion 201. In the exemplary embodiment, the left grip cover 203 is provided in a left holding portion near the left end of the ring-shaped portion 201, and the right grip cover 204 is provided in a right holding portion near the right end of the ring-shaped portion 201. It should be noted that the number of holding portions is optional, and in accordance with an operation method to be assumed, holding portions may be provided in three or more places, or a holding portion may be provided in only a single place. Further, depending on the content of the game (or the content of a fitness operation to be performed by the user in the game), only a particular holding portion among a plurality of holding portions may be held by one hand or both hands.

Figure 10:
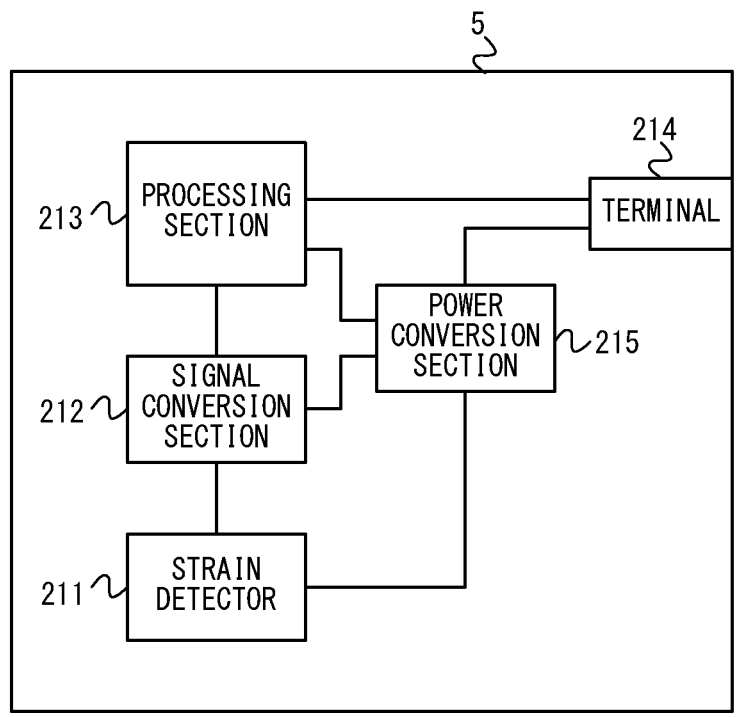
FIG. 10 is a block diagram showing a non-limiting electrical connection relationship between components of the ring-shaped extension apparatus 5.

FIG. 10 is a block diagram showing an electrical connection relationship between components of the ring-shaped extension apparatus 5. As shown in FIG. 10, the ring-shaped extension apparatus 5 includes a strain detector 211. The strain detector 211 is an example of a detector that detects deformation of the ring-shaped portion 201. In the present embodiment, the strain detector 211 includes a strain gauge. The strain detector 211 outputs a signal representing the strain of the base portion in accordance with the deformation of the elastic member (in other words, a signal representing the magnitude of deformation and the direction of deformation of the elastic member).

Here, in the exemplary embodiment, the ring-shaped portion 201 includes the elastic member that can elastically deform and the base portion. The base portion holds end portions of the elastic member so that a ring is formed by the base portion and the elastic member. It should be noted that the base portion is provided within the main portion 202, and therefore is not shown in FIG. 9. The base portion is composed of a material having higher stiffness than that of the elastic member. For example, the elastic member is composed of a resin (specifically, FRP (Fiber Reinforced Plastics)), and the base portion is composed of a metal. The strain gauge is provided in the base portion and detects the strain of the base portion. When the ring-shaped portion 201 deforms from a steady state, the base portion strains due to the deformation. Thus, the strain gauge detects the strain of the base portion. Based on the detected strain, it is possible to calculate the direction in the ring-shaped portion 201 deforms (i.e., the direction in which the two grip covers 203 and 204 come close to or go away from each other) and the deformation amount.

It should be noted that in another exemplary embodiment, the strain detector 211 may include any sensor capable of detecting that the ring-shaped portion 201 deforms from the steady state, instead of the strain gauge. For example, the detector 211 may include a pressure-sensitive sensor that detects pressure applied when the ring-shaped portion 201 deforms, or may include a bending sensor that detects the amount of bending the ring-shaped portion 201.

The ring-shaped extension apparatus 5 includes a signal conversion section 212. In the present embodiment, the signal conversion section 212 includes an amplifier and an AD converter. The signal conversion section 212 is electrically connected to the strain detector 211 so as to amplify the output signal from the strain detector 211 through the amplifier and performs an AD conversion through the AD converter. The signal conversion section 212 outputs a digital signal representing the strain value detected by the strain detector 211. Note that in other embodiments, the signal conversion section 212 may not include an AD converter, and a processing section 213 to be described below may include an AD converter.

The ring-shaped extension apparatus 5 includes the processing section 213. The processing section 213 is a processing circuit including a processor and a memory, and is an MCU (Micro Controller Unit), for example. The processing section 213 is electrically connected to the signal conversion section 212, and the output signal from the signal conversion section 212 is input to the processing section 213. The ring-shaped extension apparatus 5 includes the terminal 214. The terminal 214 is electrically connected to the processing section 213. When the right controller 4 is attached to the ring-shaped extension apparatus 5, the processing section 213 sends information representing the strain value that is represented by the output signal from the signal conversion section 212 (in other words, the ring operation data described below) to the right controller 4 through the terminal 214.

The ring-shaped extension apparatus 5 includes a power conversion section 215. The power conversion section 215 is electrically connected to the sections 211 to 214. The power conversion section 215 supplies power, which is supplied from the outside (i.e., the right controller 4) through the terminal 214, to the sections 211 to 214. The power conversion section 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the amount of deformation of the elastic member 241 based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 11:
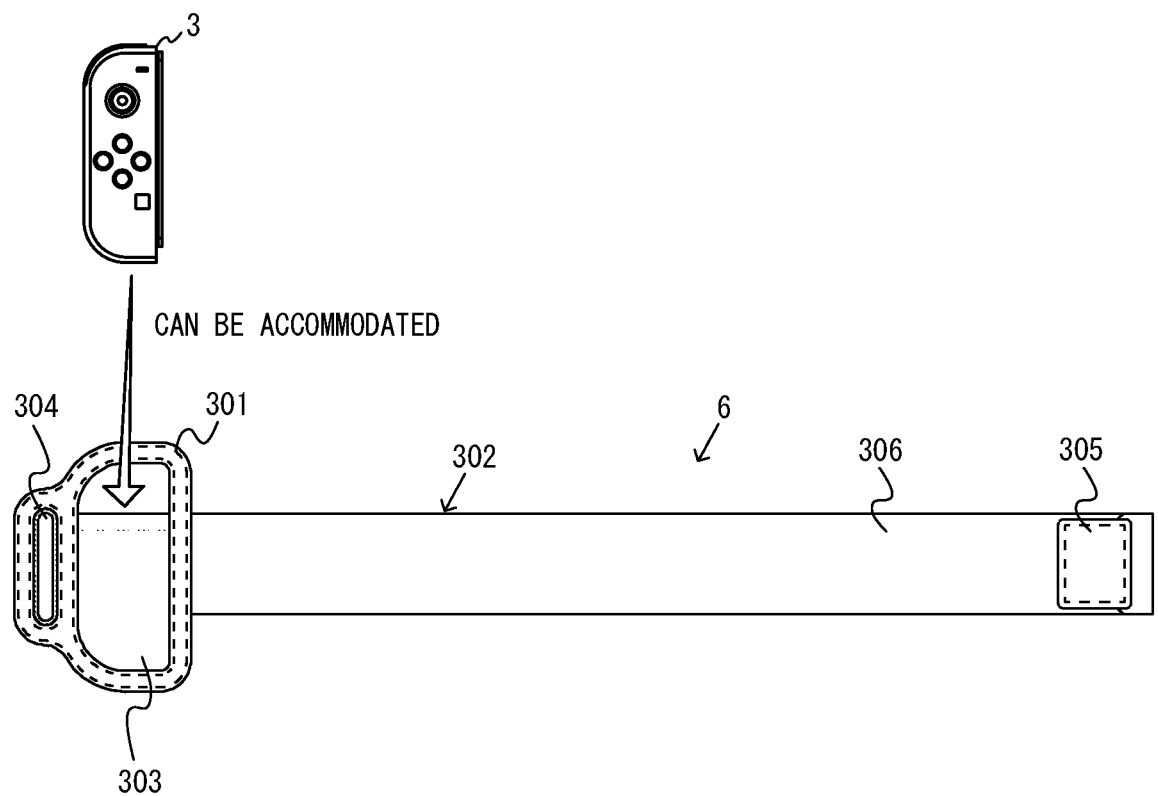
FIG. 11 is a diagram showing a non-limiting example of a belt-shaped extension apparatus 6.

FIG. 11 is a diagram showing an example of a belt-shaped extension apparatus. The belt-shaped extension apparatus 6 is fastened to a leg of the user with the left controller 3 accommodated therein (see FIG. 12). As shown in FIG. 11, the belt-shaped extension apparatus 6 includes an accommodating portion 301 and a belt portion 302. The accommodating portion 301 has a flat shape and is capable of accommodating the left controller 3 therein. Specifically, the accommodating portion 301 includes a pocket portion 303. The pocket portion 303 is formed in a bag shape that is sized so that the left controller 3 can be accommodated therein. In the present embodiment, as the left controller 3 is accommodated in the accommodating portion 301, the left controller 3 is attached to the belt-shaped extension apparatus 6. Note that in other embodiments, there is no limitation on the configuration for attaching the left controller 3 to the belt-shaped extension apparatus 6.

The accommodating portion 301 includes a through hole 304 on one side of the pocket portion 303. The belt portion 302 has a strip shape, and one end of the belt portion 302 is fixed to the accommodating portion 301. In the exemplary embodiment, the belt portion 302 is composed of a material having stretch properties (e.g., woven rubber).

A first touch fastener 305 and a second touch fastener 306 are provided on the surface of the belt portion 302 on the same side as the pocket portion 303 is provided on the accommodating portion 301. The first touch fastener 305 is provided near the end portion of the belt portion 302 that is on the opposite side from the other end portion that is secured to the accommodating portion 301. The second touch fastener 306 is provided on the same surface as the first touch fastener 305 and on the side that is closer to the accommodating portion 301 than the first touch fastener 305. The first touch fastener 305 and the second touch fastener 306 are attachable to and detachable from each other. For example, the first touch fastener 305 is a hook-side touch fastener, and the second touch fastener 306 is a loop-side touch fastener.

When fastening the belt-shaped extension apparatus 6, the user passes the belt portion 302 through the through hole 304 with the belt portion 302 wound around a leg, and the user fastens together the first touch fastener 305 and the second touch fastener 306. Thus, the user can fasten the belt-shaped extension apparatus 6, with the left controller 3 accommodated therein, to a leg, as shown in FIG. 12.

Figure 12:
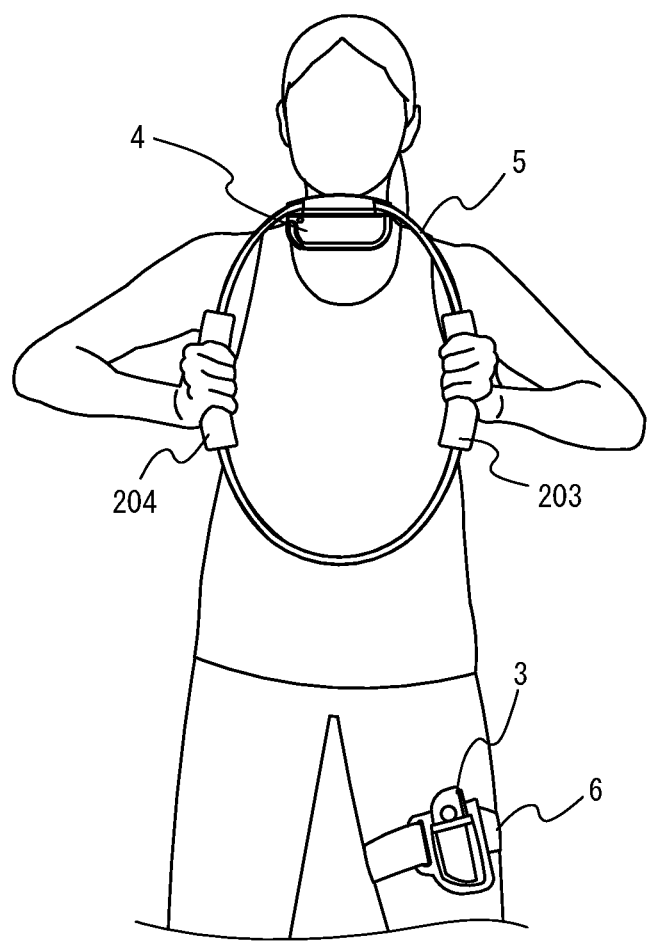
FIG. 12 is a diagram showing a non-limiting example of the state where a user uses the ring-shaped extension apparatus 5 and the belt-shaped extension apparatus 6.

FIG. 12 is a diagram showing an example of the state where the user uses the ring-shaped extension apparatus 5 and the belt-shaped extension apparatus 6. As shown in FIG. 12, the user can play a game using two extension apparatuses 5 and 6 in addition to a game apparatus (e.g., the main body apparatus 2 and the controllers 3 and 4). For example, the user can use the ring-shaped extension apparatus 5 and the belt-shaped extension apparatus 6 as a set.

For example, as shown in FIG. 12, the user holds the ring-shaped extension apparatus 5 with the right controller 4 attached thereto with both hands, and fastens the belt-shaped extension apparatus 6 with the left controller 3 accommodated therein to a leg. The user can play a game by performing an operation using the ring-shaped extension apparatus 5 (e.g., an operation of deforming the ring-shaped extension apparatus 5 and an operation of moving the ring-shaped extension apparatus 5), and performing an operation of moving the leg to which the belt-shaped extension apparatus 6 is fastened.

It should be noted that FIG. 12 shows the state where the user performs the operation of deforming the ring-shaped extension apparatus 5 while holding the grip covers 203 and 204. By this operation, the user can perform a fitness operation for strengthening both arms as a game operation. It should be noted that the user can perform a game operation by various operations on the ring-shaped extension apparatus 5. For example, the user can also perform the operation of deforming the ring-shaped extension apparatus 5 in the state where the user holds one of the grip covers with both hands and holds the other grip cover against their abdominal area. By this operation, the user can perform a fitness operation for strengthening their arms and abdominal muscles as a game operation. Further, the user can also perform the operation of deforming the ring-shaped extension apparatus 5 in the state where the user sandwiches the ring-shaped extension apparatus 5 with their legs while holding the grip covers 203 and 204 against the inner thighs of both legs. By this operation, the user can perform a fitness operation for strengthening leg muscles as a game operation.

When the game process is executed on the main body apparatus 2, the right controller 4 receives the ring operation data from the ring-shaped extension apparatus 5. The ring operation data includes information that represents the strain value. Specifically, the processing section 213 of the ring-shaped extension apparatus 5 transmits the ring operation data to the right controller 4 through the terminal 214. For example, the processing section 213 repeatedly transmits the ring operation data at the rate of once per a predetermined amount of time.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that in the state where the right controller 4 is attached to the ring-shaped extension apparatus 5, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

On the other hand, where the game process is executed on the main body apparatus 2, the communication control section 101 of the left controller 3 transmits the left controller operation data including information obtained from the input sections included in the left controller 3 (specifically, the buttons 103, the analog stick 32 and the sensors 104 and 105) to the main body apparatus 2. In the state where the left controller 3 is attached to the belt-shaped extension apparatus 6, the communication from the left controller 3 to the main body apparatus 2 is done by wireless communication.

(Overview of Game According to Exemplary Embodiment)

Next, an overview of a game according to the exemplary embodiment is described. In the exemplary embodiment, the game is performed using the ring-shaped extension apparatus 5 to which the right controller 4 is attached, and the belt-shaped extension apparatus 6 to which the left controller 3 is attached. The game according to the exemplary embodiment is a fitness game for causing the user to exercise. As shown in FIG. 12, in the state where the user holds the ring-shaped extension apparatus 5 with both hands, and the belt-shaped extension apparatus 6 is fastened to their leg (e.g., thigh), the user exercises according to an instruction, thereby playing the game. Hereinafter, the ring-shaped extension apparatus 5 to which the right controller 4 is attached will be occasionally referred to as a "ring controller", and the belt-shaped extension apparatus 6 to which the left controller 3 is attached will be occasionally referred to as a "leg controller".

In a predetermined game scene in the game according to the exemplary embodiment, music is output in accordance with operations on the ring controller. Hereinafter, first, the operations on the ring controller performed by the user will be described, and then, the output of music corresponding to the operation will be described.

Figure 13:
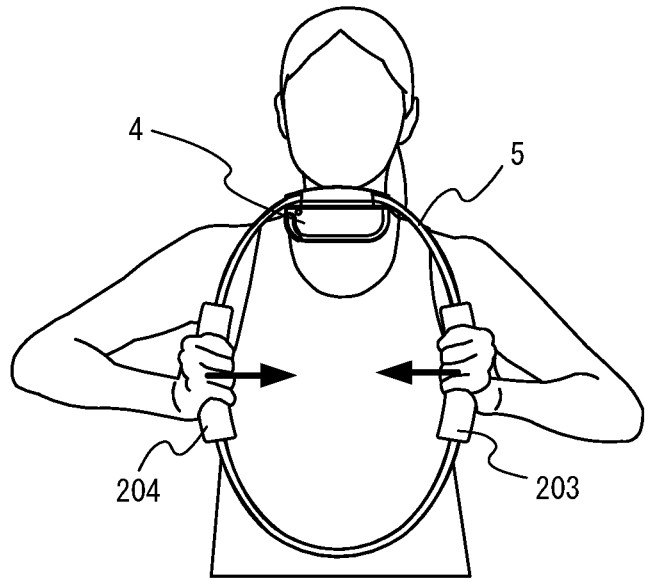
FIG. 13 is a diagram showing a push-in operation, which is a non-limiting example of operations on a ring controller.
Figure 14:
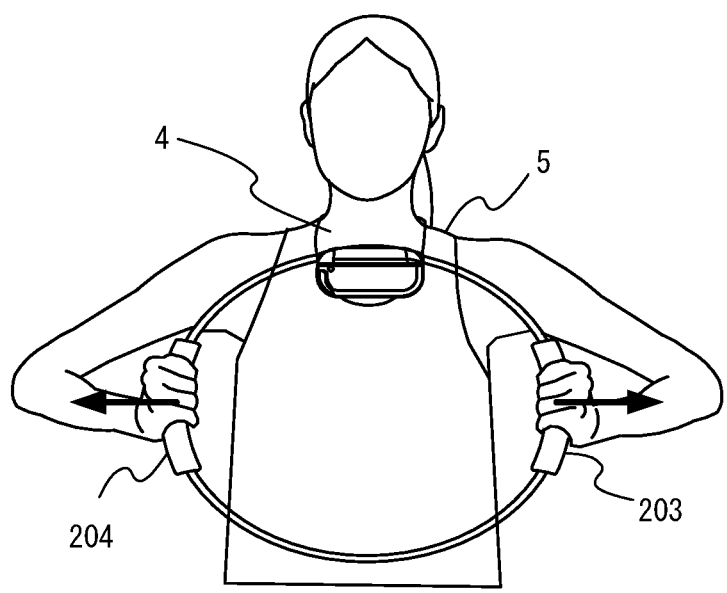
FIG. 14 is a diagram showing a pull operation, which is a non-limiting example of the operations on the ring controller.

FIG. 13 is a diagram showing a push-in operation, which is an example of the operations on the ring controller. FIG. 14 is a diagram showing a pull operation, which is an example of the operations on the ring controller.

As shown in FIG. 13, while holding the grip covers 203 and 204 of the ring controller with both hands, the user operates the ring controller by pushing in the ring controller from the left and right directions toward the center of the ring. When this push-in operation is performed, the ring controller deforms from a circular ring shape to an approximately elliptical shape of which the short axis is a line segment connecting the grip covers 203 and 204. At this time, the strain detector 211 (a sensor for detecting the deformation of the ring controller, specifically the strain gauge) outputs a signal indicating the strain of the base portion corresponding to the deformation of the elastic member. Based on this signal, data (ring operation data) regarding the detection result of the strain detection section is transmitted from the ring-shaped extension apparatus 5 to the right controller 4, and the right controller 4 transmits this data to the main body apparatus 2. Based on the data, the main body apparatus 2 acquires deformation information regarding the ring controller. It should be noted that "acquiring deformation information regarding the ring controller" may be the acquisition of the output signal itself from the strain detector 211, or may be the acquisition of the result of performing a predetermined process (the conversion of the data format or a calculation process) based on the output signal from the strain detector 211. Here, the "deformation information" is information indicating that the ring controller deforms, and indicating the amount of the deformation. For example, the "deformation information" is information represented by a positive or negative strain value. For example, when the ring controller is pushed in, the main body apparatus 2 acquires a positive strain value as the deformation information. It should be noted that hereinafter, a positive strain value to be output when the ring controller is pushed in will be occasionally referred to as a "push-in amount". The "push-in amount" differs in accordance with the strength of the force of pushing in the ring controller.

Further, as shown in FIG. 14, the user can also operate the ring controller by pulling the ring controller from the center of the ring toward the left and right directions. When this pull operation is performed, the ring controller deforms from the circular ring shape to an approximately elliptical shape of which the long axis is a line segment connecting the grip covers 203 and 204. When the ring controller is pulled, the main body apparatus 2 acquires a negative strain value as the deformation information. It should be noted that hereinafter, a negative strain value to be output when the ring controller is pulled will be occasionally referred to as a "pull amount". The "pull amount" differs in accordance with the strength of the force of pulling the ring controller.

Figure 15:
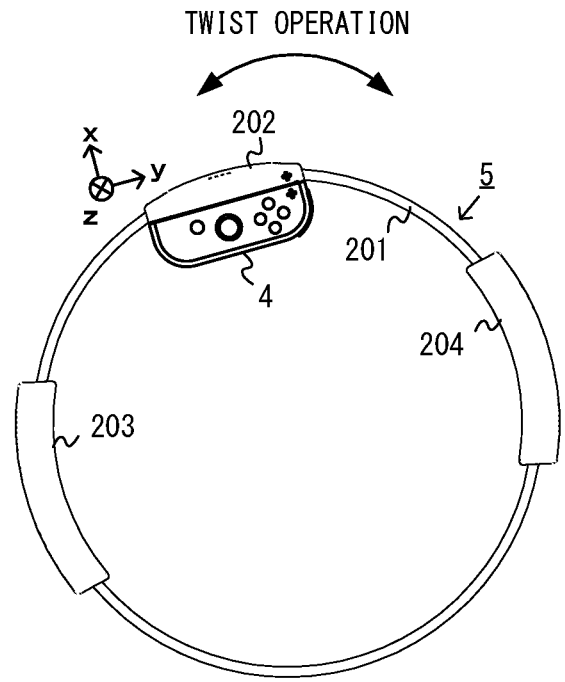
FIG. 15 is a diagram showing a twist operation, which is a non-limiting example of the operations on the ring controller.
Figure 16:
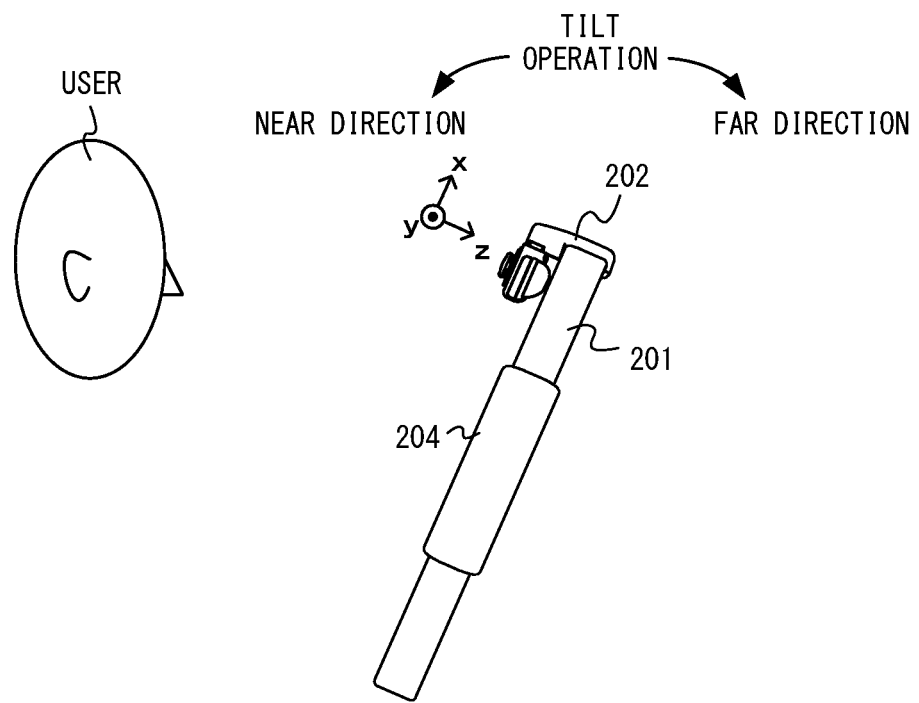
FIG. 16 is a diagram showing a tilt operation, which is a non-limiting example of the operations on the ring controller.

FIG. 15 is a diagram showing a twist operation, which is an example of the operations on the ring controller. FIG. 16 is a diagram showing a tilt operation, which is an example of the operations on the ring controller.

As shown in FIG. 15, while holding the grip covers 203 and 204 of the ring controller with both hands, the user can rotate the ring controller about the central axis of the ring (an axis parallel to a z-axis of the right controller 4). Hereinafter, the operation of rotating the ring controller about the central axis of the ring will be occasionally referred to as a "twist operation", and the rotational angle of the twist operation about the central axis will be occasionally referred to as a "twist amount".

Further, as shown in FIG. 16, the user can tilt the ring controller in a far direction (clockwise in FIG. 16) or a near direction (counterclockwise in FIG. 16) as viewed from the user. Specifically, the user can rotate the ring controller about a straight line parallel to a y-axis of the right controller 4. The operation of rotating the ring controller in the far direction or the near direction as viewed from the user will be occasionally referred to as a "tilt operation", and the rotational angle of the tilt operation will be occasionally referred to as a "tilt amount".

It should be noted that the orientation of the ring controller in which a negative x-axis direction of the right controller 4 is parallel to the direction of gravity is referred to as a "reference orientation". In the reference orientation, the twist amount and the tilt amount are "0".

Based on the orientation of the ring controller, it is determined whether or not the twist operation and/or the tilt operation are performed on the ring controller. The orientation of the ring controller (the right controller 4) is calculated based on data from the acceleration sensor 114 and the angular velocity sensor 115 of the right controller 4. Specifically, the main body apparatus 2 integrates angular velocity values detected by the angular velocity sensor 115, thereby calculating a change in the orientation from the reference orientation. Thus, the main body apparatus 2 can calculate the current orientation of the ring controller. Further, also based on acceleration values detected by the acceleration sensor 114, the main body apparatus 2 calculates the current orientation of the ring controller.

Further, the user can perform a "swing operation" on the ring controller. The "swing operation" is the operation of rapidly changing the orientation of the ring controller in a short time, or rapidly moving the ring controller in a short time. The "swing operation" is detected based on acceleration values detected by the acceleration sensor 114 of the right controller 4. It should be noted that the swing operation may be detected based on a change in the orientation of the ring controller.

(Output of Music Based on Operation)

Next, the output of music based on each operation on the ring controller is described.

FIG. 17 is a diagram showing an overview of the output of music based on the operations on the ring controller. As shown in FIG. 17, the main body apparatus 2 acquires sensor data from the ring controller (specifically, the right controller 4). The sensor data is data based on output from each sensor (the acceleration sensor 114, the angular velocity sensor 115, and the strain detector 211).

If receiving sensor data, based on this data, the main body apparatus 2 calculates the deformation information regarding the deformation (the push-in amount or the pull amount) of the ring controller. Further, based on data from the angular velocity sensor 115 and the acceleration sensor 114, the main body apparatus 2 calculates orientation information. The "orientation information" is the tilt amount and the twist amount. Further, based on data from the acceleration sensor 114, the main body apparatus 2 makes a swing determination regarding whether or not the ring controller is swung.

Further, in the main body apparatus 2, sound data is stored in advance. The sound data includes, for example, sound data regarding BGM (Back Ground Music), sound data regarding an instrument sound to be output when a predetermined instrument is played, and sound data regarding a predetermined sound effect (e.g., a human voice, an electronic sound, or the like).

Based on the deformation information, the orientation information, and the result of the swing determination, the main body apparatus 2 generates music data using a single piece of sound data or a plurality of pieces of sound data and outputs music from the speakers. For example, the main body apparatus 2 outputs music obtained by applying an acoustic effect to basic music, such as adding BGM, applying a filter, performing a delay process, adding an instrument sound and a sound effect, or changing the musical interval.

A description is given below of the generation and the output of music based on the deformation information, the orientation information, and the result of the swing determination.

(Generation and Output of Music in First Game Scene)

In a first game scene according to the exemplary embodiment (e.g., an ending scene when the game is cleared), a game image is output, and music corresponding to the operations on the ring controller is also generated and output.

Figure 18:
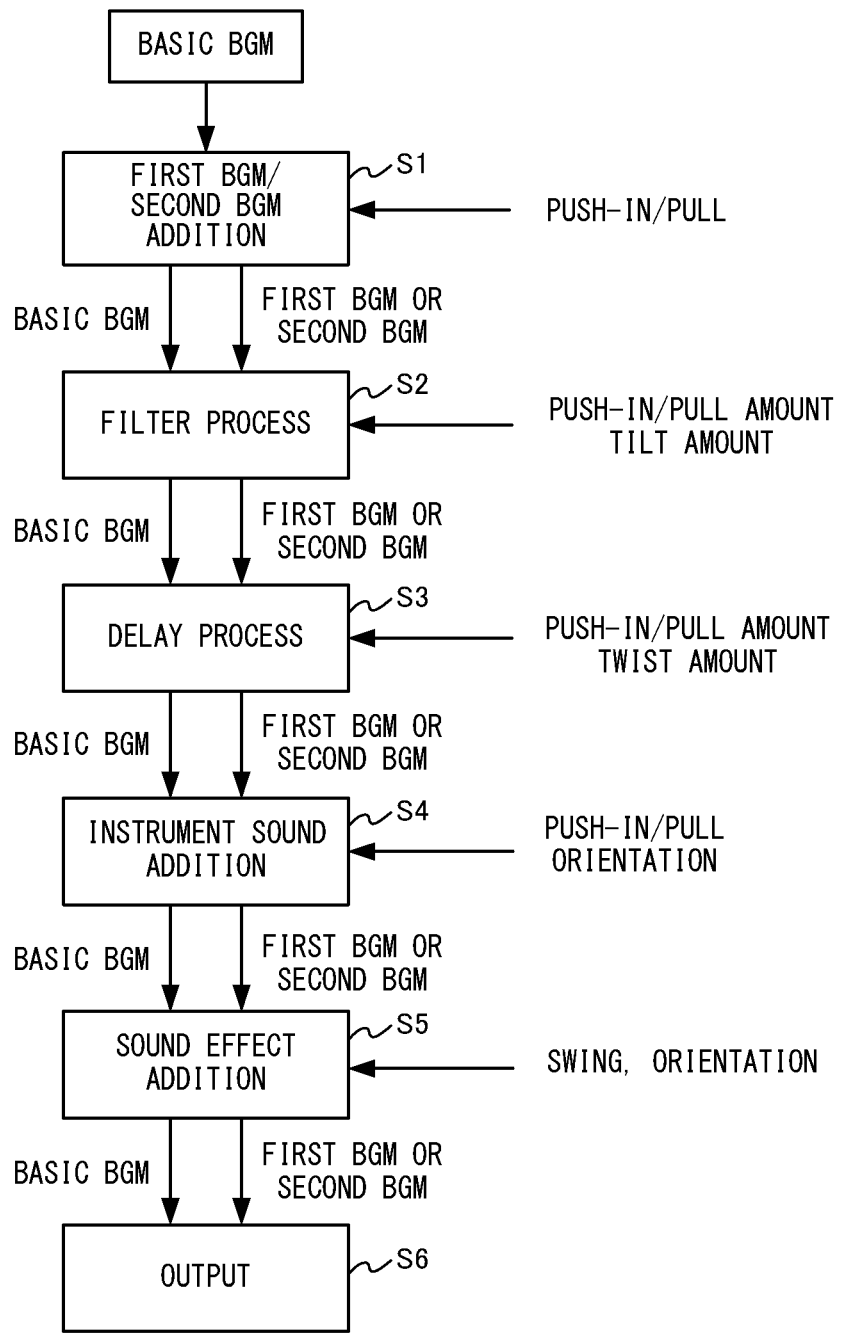
FIG. 18 is a diagram showing a non-limiting overview of the output of music based on the operations on the ring controller in a first game scene.

FIG. 18 is a diagram showing an overview of the output of music based on the operations on the ring controller in the first game scene.

As shown in FIG. 18, in the first game scene, basic BGM is reproduced and output. The basic BGM is music having some length and is music having timbre centered on piano, for example. Sound data regarding the basic BGM is stored in advance in (the flash memory 84 or the external storage medium of) the main body apparatus 2. For example, the basic BGM automatically starts to be reproduced when the first game scene is started.

When the push-in operation is performed on the ring controller, first BGM is added to the basic BGM (step S1). The first BGM is music having a melody similar to that of the basic BGM and is music having timbre different from that of the basic BGM. For example, the first BGM may be music having a melody similar to that of the basic BGM, and may be orchestral music. Further, when the pull operation is performed on the ring controller, second BGM is added to the basic BGM. The second BGM is music having a melody similar to that of the basic BGM and is music having timbre different from the basic BGM and the first BGM. For example, the second BGM may be music having timbre based on an electronic sound.

Sound data regarding the first BGM and the second BGM is stored in advance in the main body apparatus 2. When the push-in operation or the pull operation is performed, the sound volume of the first BGM or the second BGM is set in accordance with the deformation amount (the push-in amount or the pull amount). The output of the first BGM or the second BGM corresponding to the push-in operation or the pull operation will be described below with reference to FIGS. 19 and 20.

Next, a filter process is performed on a sound to be output (step S2). Specifically, based on the deformation amount (the push-in amount or the pull amount) and the tilt amount of the ring controller, the filter process is performed on the BGM (the basic BGM, the first BGM, or the second BGM).

For example, when the ring controller is tilted in the far direction, a low-pass filter is applied. The low-pass filter is a filter for, in the sound to be output, allowing the passage of sounds having relatively low frequencies and cutting or attenuating sounds having relatively high frequencies. Further, when the ring controller is tilted in the near direction, a bandpass filter is applied. The bandpass filter is a filter for, in the sound to be output, allowing the passage of sounds of a particular frequency band and cutting or attenuating sounds other than the particular frequency band (sounds having frequencies lower than and sounds higher than the particular frequency band). The low-pass filter or the bandpass filter is applied to the sound to be output, whereby how the sound is heard changes.

When the low-pass filter or the bandpass filter is selected in accordance with the tilt of the ring controller, a filter value indicating the level of the filter is calculated. The filter value is calculated based on the tilt amount and the deformation amount. Specifically, the filter value is calculated based on the product of the tilt amount and the deformation amount. The greater the tilt amount, the greater the filter value. Further, the greater the deformation amount, the greater the filter value.

The greater the filter value, the more different how the sound is heard than in a case where the filter is not applied. For example, the range of the frequency to be attenuated may be the same, and the attenuation level may differ in accordance with the filter value. For example, the range of the frequency to be attenuated may be fixed, and the greater the filter value, the higher the attenuation level. Further, in accordance with the filter value, the range of the frequency to be cut or attenuated may differ. For example, the greater the filter value, the wider the range of the frequency to be cut or attenuated. Further, the center of the range of the frequency to be cut or attenuated may differ depending on the filter value. For example, it may be set such that the greater the filter value, the higher (or lower) the center frequency of the frequency band of which the passage is allowed by the bandpass filter.

Next, in addition to the filter process, a delay process is further performed (step S3). The delay process is performed based on the deformation amount and the twist amount of the ring controller. The delay process is the process of outputting, a predetermined time later together with a certain sound to be output, a sound obtained by attenuating the certain sound. Here, the certain sound to be output is occasionally referred to as an "original sound", and the sound to be output the predetermined time later is occasionally referred to as a "delay sound". By the delay process, it is possible to reverberate the original sound. The delay process is performed on each original sound to be output. For example, when the basic BGM and the first BGM are output as original sounds, and the delay process is performed, a delay sound obtained by attenuating the basic BGM is output the predetermined time later than the basic BGM, and a delay sound obtained by attenuating the first BGM is output the predetermined time later than the first BGM. It should be noted that when the filter process is performed on the BGM (the basic BGM, the first BGM, and the second BGM), the delay process is performed on the BGM subjected to the filter process.

Specifically, the sound volume of the delay sound is calculated based on the product of the twist amount and the deformation amount. The greater the twist amount, the greater the sound volume of the delay sound. Further, the greater the deformation amount, the greater the sound volume of the delay sound. The sound volume of the delay sound is set to, for example, 0 to 1 times the sound volume of the original sound. When the twist amount or the deformation amount is zero, the sound volume of the delay sound is set to zero. That is, in this case, the delay sound is not output. Parameters regarding the delay other than that of the sound volume (e.g., a parameter regarding how much the delay sound is delayed relative to the original sound, and the number of delays) are determined in advance. It should be noted that the parameters regarding the delay other than that of the sound volume may also be set in accordance with the operations on the ring controller. For example the parameters regarding this delay may be set based on the orientation information and/or the deformation information.

In addition to the delay process, an instrument sound is further added (step S4). Specifically, when the push-in operation or the pull operation on the ring controller is detected, an instrument sound is added in accordance with the orientation of the ring controller at this time. The output of the instrument sound will be described below with reference to FIG. 22.

Next, when the swing operation is further performed, a sound effect is added in addition to the instrument sound (step S5). The sound effect is a sound different from the instrument sound in step S4, and for example, may be a human voice, an electronic sound, or the like. In the main body apparatus 2, a plurality of sound effects are stored in advance. Specifically, when the swing operation is sensed, any of the plurality of sound effects is selected in accordance with the orientation of the ring controller at this time. Further, the sound effect to be output is changed in accordance with the orientation of the ring controller. For example, when the swing operation is sensed, the reproduction speed of the sound effect differs in accordance with the twist amount at this time. The output of the sound effect will be described below with reference to FIG. 23.

Then, music corresponding to the results of the processes of steps S1 to S5 is output from the speakers (step S6).

Next, with reference to the drawings, the processes of the above steps S1, S4, and S5 are specifically described.

Figure 19:
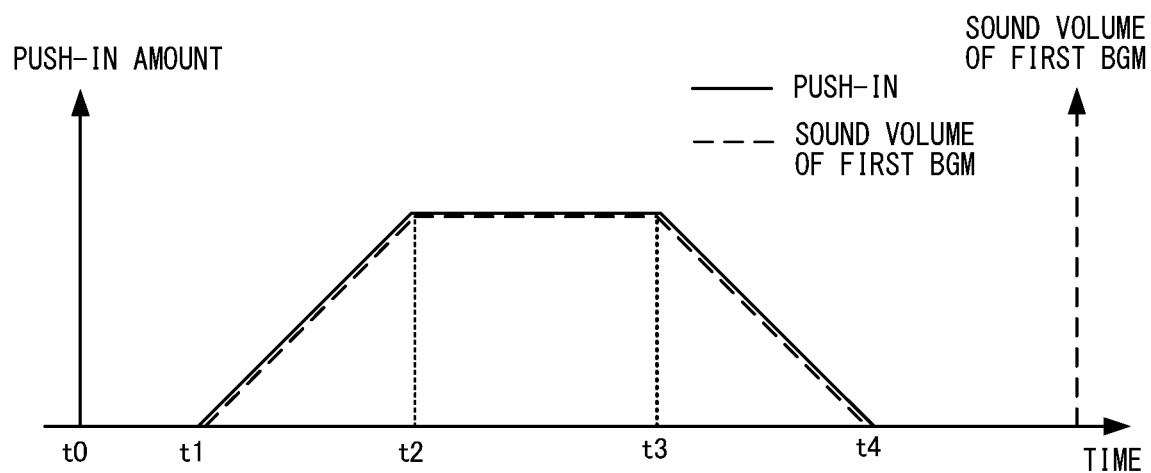
FIG. 19 is a diagram showing a non-limiting example of the relationship between a push-in amount and the sound volume of first BGM when the push-in operation is performed on the ring controller.

FIG. 19 is a diagram showing an example of the relationship between the push-in amount and the sound volume of the first BGM when the push-in operation is performed on the ring controller.

In FIG. 19, a horizontal axis represents time, and a vertical axis represents the push-in amount or the sound volume of the first BGM. Further, a solid line in FIG. 19 indicates the push-in amount, and a dashed line indicates the sound volume of the first BGM.

As shown in FIG. 19, suppose that the push-in operation is not performed from a time t0 to a time t1. From the time t0 to the time t1, the sound volume of the first BGM is set to "0". During this time, the basic BGM is output from the speakers, and the first BGM is not output from the speakers. When the push-in operation is started at the time t1, and the push-in amount increases to a time t2, the sound volume of the first BGM increases in accordance with the increase in the push-in amount. Consequently, the first BGM is output, superimposed on the basic BGM, from the speakers. When the push-in amount is maintained from the time t2 to a time t3, the sound volume of the first BGM is also maintained. Then, when the push-in amount decreases from the time t3 to a time t4, the sound volume of the first BGM also decreases. When the push-in amount changes to "0" at the time t4 (i.e., when the push-in operation is no longer performed), the sound volume of the first BGM also changes to "0".

As described above, from a time t1 to a time t4, the sound volume of the first BGM is calculated by following the push-in amount, and the first BGM is output with the calculated sound volume. Consequently, while the push-in operation is performed, the first BGM is continuously output, superimposed on the basic BGM, from the speakers.

Figure 20:
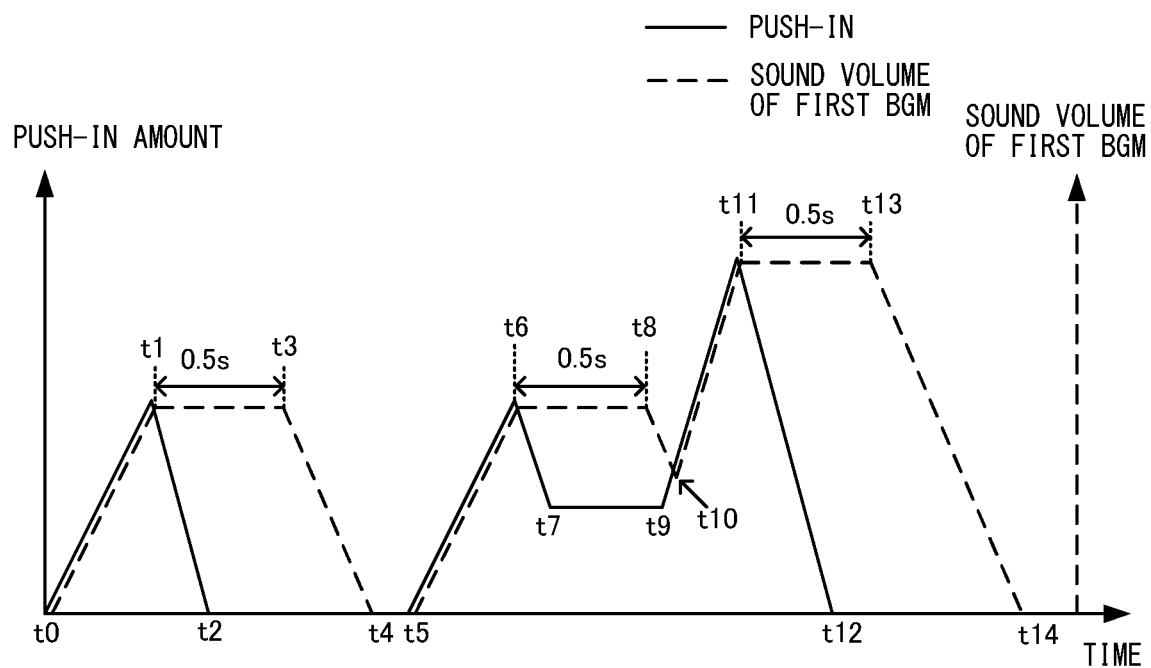
FIG. 20 is a diagram showing a non-limiting example of the relationship between the push-in amount and the sound volume of the first BGM when the push-in operation is performed on the ring controller, and a push-in speed exceeds a threshold.

FIG. 20 is a diagram showing an example of the relationship between the push-in amount and the sound volume of the first BGM when the push-in operation is performed on the ring controller, and a push-in speed exceeds a threshold.

As shown in FIG. 20, suppose that the push-in amount increases from a time t0 to a time t1. During this time, the sound volume of the first BGM is set by following the push-in amount. When a push-in speed (an increase in the push-in amount per unit time) from the time t0 to the time t1 exceeds a predetermined threshold, and even when the push-in amount decreases from the time t1, the sound volume of the first BGM decreases later than the decrease in the push-in amount. Specifically, even when the push-in amount shifts to a decrease from the time t1 and changes to "0" at a time t2, and when the push-in speed from the time t0 to the time t1 exceeds the predetermined threshold, the sound volume of the first BGM at the time t1 is maintained for a predetermined time (e.g., 0.5 seconds). From a time t3 when the predetermined time elapses since the time t1, the sound volume of the first BGM starts to decrease. Then, at a time t4, the sound volume of the first BGM is set to "0". From the time t3 to the time t4, the sound volume of the first BGM decreases at a constant rate.

As described above, when the user pushes in the ring controller in a short time, and the push-in speed exceeds the threshold, and then, even when the user stops pushing in the ring controller, and the push-in amount rapidly decreases, the sound volume of the first BGM does not rapidly decrease, and the first BGM remains as a reverberation.

Next, suppose that the push-in operation is started again at a time t5, and the push-in amount increases to a time t6. From the time t5 to the time t6, the sound volume of the first BGM increases by following the push-in amount. The push-in speed from the time t5 to the times t6 also exceeds the predetermined threshold. Next, the push-in amount decreases from the time t6 to a time t7 and maintains a certain value from the time t7 to a time t9. In this case, the sound volume of the first BGM is maintained for the predetermined time (0.5 seconds) from the time t6. Then, from a time t8 when the predetermined time elapses, the sound volume of the first BGM starts to decrease at a constant speed.

Here, between the sound volume of the first BGM that decreases at the constant speed and the sound volume calculated in accordance with the push-in amount, the greater sound volume is set as the sound volume of the first BGM. For example, as shown in FIG. 20, suppose that the push-in amount shifts to an increase from the time t9. At the time t9, the sound volume of the first BGM that decreases at the constant speed is greater than the sound volume calculated in accordance with the push-in amount. Thus, at the time t9, the sound volume that decreases at the constant speed is set as the sound volume of the first BGM.

On the other hand, at a time t10 after the time t9, the sound volume calculated in accordance with the push-in amount and the sound volume that decreases at the constant speed match each other. At the time t10 and after that, the sound volume calculated in accordance with the push-in amount is greater than the sound volume that decreases at the constant speed. Thus, at the time t10 and after that, the sound volume of the first BGM is set in accordance with the push-in amount at this time. Specifically, from the time t10 to a time t11, the push-in amount increases, and the sound volume of the first BGM is set by following the increase in the push-in amount.

When the push-in speed exceeds the predetermined threshold from the time t10 to the time t11, the push-in amount starts to decrease from the time t11. Even when the push-in amount changes to "0" at a time t12, the sound volume at the time t11 is maintained for the predetermined time. Then, at a time t13 when the predetermined time elapses, the sound volume of the first BGM starts to decrease. At the time t13 and after that, the sound volume of the first BGM decreases at the constant speed.

As shown in FIG. 19, when the push-in speed is less than or equal to the predetermined threshold, the sound volume of the first BGM is calculated in accordance with the push-in amount and changes by following the push-in amount. On the other hand, as shown in FIG. 20, when the push-in speed exceeds the predetermined threshold, the sound volume of the first BGM does not follow the push-in amount. Specifically, when the push-in speed exceeds the predetermined threshold, and even when the push-in amount decreases after that, the sound volume is maintained for the predetermined time, and after the lapse of the predetermined time, decreases at the constant speed. Before and after the lapse of the predetermined time, the sound volume calculated in accordance with the push-in amount and the current sound volume (the sound volume maintained for the predetermined time or the sound volume that decreases at the constant speed) are compared with each other, and the greater sound volume is set as the sound volume of the first BGM.

In FIGS. 19 and 20, a case has been described where the push-in operation is performed on the ring controller. Also when the pull operation is performed on the ring controller, similar control is performed. When the pull operation is performed on the ring controller, the second BGM is output. When a pull speed (the amount of increase in the pull amount per unit time) is less than or equal to a predetermined threshold, the sound volume of the second BGM changes by following the pull amount. Further, when the pull speed exceeds the predetermined threshold, the sound volume of the second BGM does not follow the pull amount. Specifically, when the pull speed exceeds the predetermined threshold, the sound volume of the second BGM is maintained for a predetermined time, and after the lapse of the predetermined time, decreases at a constant speed. Before and after the lapse of the predetermined time, the sound volume calculated in accordance with the pull amount and the current sound volume (the sound volume maintained for the predetermined time or the sound volume that decreases the constant speed) are compared with each other, and the greater sound volume is set as the sound volume of the second BGM.

As described above, the first BGM is added to the basic BGM in accordance with the push-in operation, and the second BGM is added in accordance with the pull operation. When the push-in speed or the pull speed is great, the sound volume is maintained for a predetermined time. Thus, for example, when the push-in operation and the pull operation are repeatedly performed in a short time, the sound volumes of both the first BGM and the second BGM are set to be greater than zero. Consequently, both the first BGM and the second BGM are output, superimposed on the basic BGM.

Figure 21:
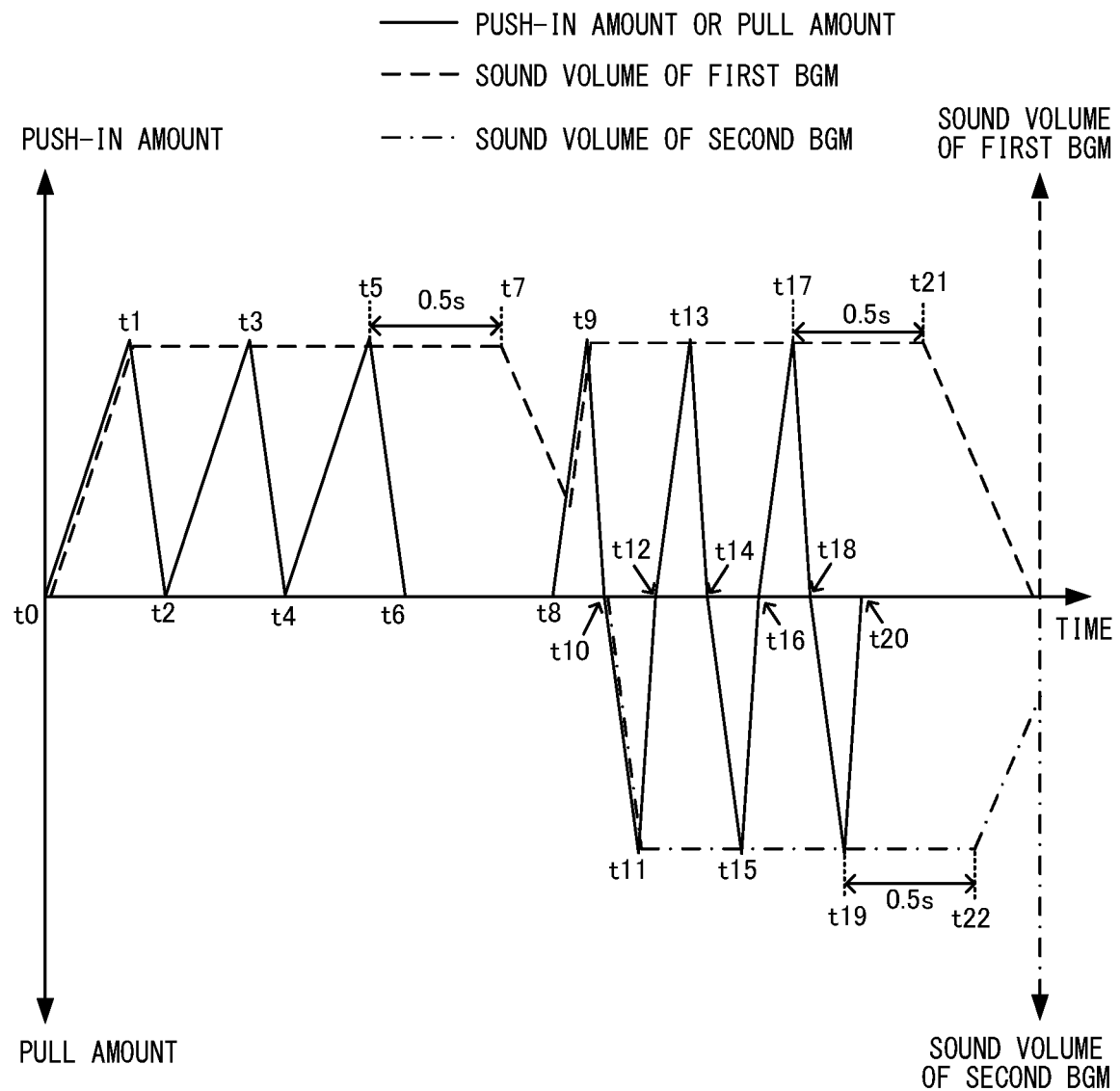
FIG. 21 is a diagram showing a non-limiting example of changes in the sound volumes of the first BGM and second BGM when the push-in operation is repeatedly performed in a short time, and when the push-in operation and the pull operation are repeatedly performed in a short time.

FIG. 21 is a diagram showing examples of changes in the sound volumes of the first BGM and the second BGM when the push-in operation is repeatedly performed in a short time and when the push-in operation and the pull operation are repeatedly performed in a short time.

In FIG. 21, an upward vertical axis represents the push-in amount or the sound volume of the first BGM, and a downward vertical axis represents the pull amount or the sound volume of the second BGM. Further, in FIG. 21, a dashed line indicates the sound volume of the first BGM, and a dashed-dotted line indicates the sound volume of the second BGM.

As shown in FIG. 21, suppose that the user strongly pushes in the ring controller from a time t0 to a time t1, stops the push-in operation at the time t1, performs the operation of changing the push-in amount to zero at a time t2, and repeats a similar operation twice after that (three times in total) (from the time t0 to a time t6). When the push-in speed in the period of each push-in operation (the period from the time t0 to the time t1, the period from a time t2 to a time t3, and the period from a time t4 to a time t5) exceeds a predetermined threshold, and the push-in amount is at maximum, the sound volume of the first BGM is maintained at the maximum sound volume from the time t1 to a time t7 (a predetermined time after the time t5). When a similar push-in operation is repeatedly performed also at the time t6 and after that, the sound volume of the first BGM is maintained at the maximum sound volume without following the push-in amount at each time.

Next, suppose that the user alternately repeats the push-in operation and the pull operation in a short time from a time t8. Specifically, the user performs the operation of strongly pushing in the ring controller from the time t8 to a time t9 and strongly pulling the ring controller from the time t9 to a time t11, and repeats a similar operation twice after that. When the push-in speed in the period of each push-in operation (the period from the time t8 to the time t9, the period from a time t12 to a time t13, and the period from a time t16 to a time t17) exceeds the predetermined threshold, and the push-in amount is at maximum, the sound volume of the first BGM is maintained at the maximum sound volume from the time t9 to a time t21 (a predetermined time after the time t17). Further, when the pull speed in the period of each pull operation (the period from a time t10 to the time t11, the period from a time t14 to a time t15, and the period from a time t18 to a time t19) exceeds the predetermined threshold, and the pull amount is at maximum, the sound volume of the second BGM is maintained at the maximum sound volume from the time t11 to a time t22 (a predetermined time after the time t19). When a similar push-in operation and a similar pull operation are alternately repeatedly performed even at a time t20 and after that, the sound volumes of the first BGM and the second BGM are maintained at the maximum sound volumes without following the push-in amount and the pull amount at each time.

As described above, basically, the sound volumes of the first BGM and the second BGM are set in accordance with the push-in amount and the pull amount, respectively. However, when the push-in speed and the pull speed exceed predetermined thresholds, the sound volumes of the first BGM and the second BGM are maintained for a predetermined time. Thus, as shown in FIG. 21, when the user quickly repeats the push-in operation and the pull operation in a short time with a strong force, the first BGM and the second BGM are continuously output with the maximum sound volumes. Consequently, it is possible to continuously output both the first BGM and the second BGM, superimposed on the basic BGM.

Figure 22:
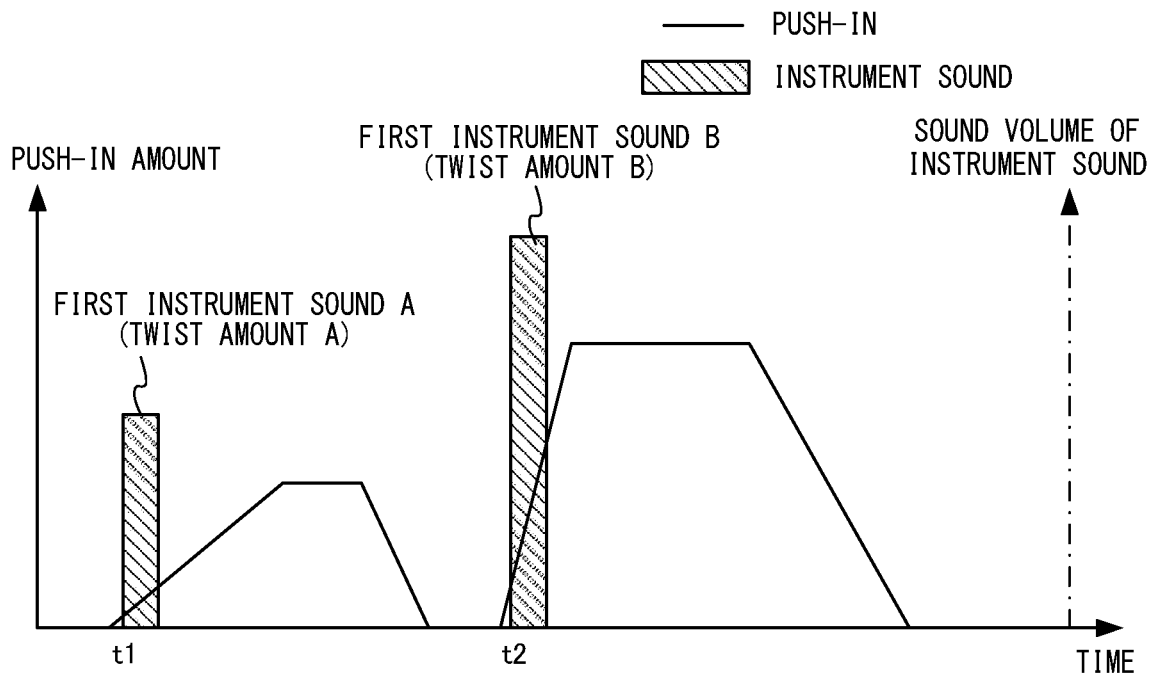
FIG. 22 is a diagram showing a non-limiting example of the relationship between a change in the push-in amount of the ring controller and the output of an instrument sound.

Next, the process of step S4 in FIG. 18 is described. FIG. 22 is a diagram showing an example of the relationship between a change in the push-in amount of the ring controller and the output of an instrument sound.

As shown in FIG. 22, when the push-in operation on the ring controller is detected, an instrument sound is output. Specifically, based on the amount of change in the push-in amount or the pull amount, the main body apparatus 2 determines whether or not the push-in operation or the pull operation is performed. For example, when the state where the push-in amount is not detected (e.g., the state where a strain value is less than or equal to a predetermined value (e.g., zero)) changes to the state where the push-in amount is detected (e.g., the state where the strain value exceeds the predetermined value (e.g., zero)), the push-in operation may be detected.

When the push-in operation is detected, a first instrument sound is reproduced and output in accordance with the orientation of the ring controller when the push-in operation is performed. Every time the push-in operation is detected, the first instrument sound is output only once. Here, in (the flash memory 84 or the external storage medium of) the main body apparatus 2, instrument sounds having a plurality of different types of timbre including a first instrument sound A and a first instrument sound B are stored as the first instrument sound to be output when the push-in operation is performed. For example, the first instrument sound A may be the sound of beating a predetermined percussion instrument (e.g., a bass drum). When the push-in operation is detected, the main body apparatus 2 selects at least one of the plurality of instrument sounds in accordance with the orientation of the ring controller (the twist amount and/or the tilt amount) at this time. For example, when the twist amount is in a first range, a certain instrument sound is selected. When the twist amount is in a second range, a different instrument sound is selected.

In the example of FIG. 22, when the push-in operation is detected by detecting a value greater than zero as the push-in amount at a time t1, and the twist amount at this time is a twist amount A, the first instrument sound A (e.g., the sound of the bass drum) is output. Further, when the push-in operation is detected at a time t2, and the twist amount at this time is a twist amount B, the first instrument sound B (e.g., a sound obtained by adding a cymbal to the bass drum) is output. It should be noted that the instrument sound to be output may differ in accordance with the tilt amount in addition to (or instead of) the twist amount.

Further, the sound volume of the instrument sound is set in accordance with the push-in speed at which the push-in operation is detected. In FIG. 22, the push-in speed at the time t2 is greater than the push-in speed at the time t1. Thus, the sound volume of the first instrument sound B is set to be greater than the sound volume of the first instrument sound A.

It should be noted that also when the pull operation is performed, an instrument sound is output by control similar to that when the push-in operation is performed. That is, when the pull operation is detected, at least one of a plurality of second instrument sounds stored in advance is output in accordance with the orientation (the twist amount and/or the tilt amount) of the ring controller at this time. In the main body apparatus 2, the plurality of second instrument sounds to be output when the pull operation is performed are stored. A second instrument sound is the sound of an instrument different from that of the first instrument sound. For example, when the pull operation is performed, the sound of beating a percussion instrument (e.g., a snare drum) different from the predetermined percussion instrument may be output.

Figure 23:
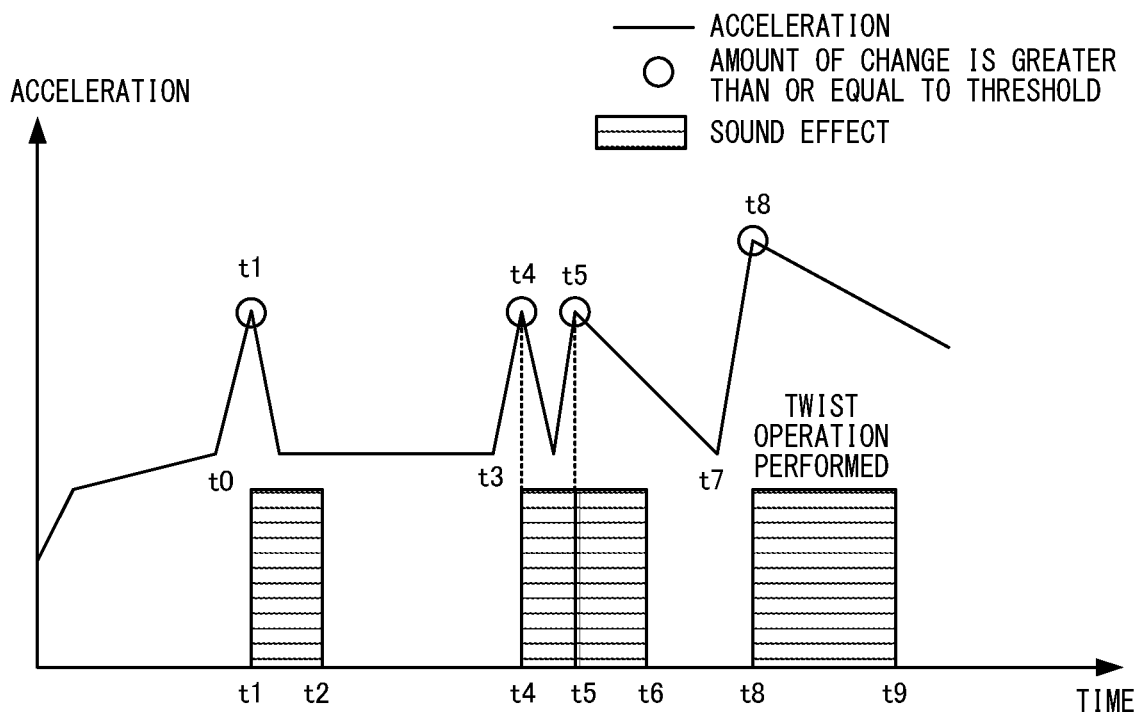
FIG. 23 is a diagram showing a non-limiting example of the relationship between a change in the acceleration of the ring controller and the output of a sound effect.

Next, the process of step S5 in FIG. 18 is described. FIG. 23 is a diagram showing an example of the relationship between a change in the acceleration of the ring controller and the output of a sound effect.

The acceleration sensor 114 of the ring controller (the right controller 4) detects accelerations in xyz axial directions. Based on output from the acceleration sensor 114, the main body apparatus 2 calculates the magnitude of an acceleration vector (a three-dimensional vector having components in the xyz axes), and based on the calculated magnitude of the acceleration vector, determines whether or not the swing operation is performed.

As shown in FIG. 23, when it is determined that the swing operation is performed at a time t1, the main body apparatus 2 starts to reproduce and output a sound effect. For example, when the amount of change in the acceleration at the time t1 (the difference between the acceleration at a time t0 immediately before the time t1 and the acceleration at the time t1) exceeds a predetermined threshold, it may be determined that the swing operation is performed. Further, when a value obtained by dividing the acceleration at the time t1 by the acceleration at the time t0 is greater than or equal to a predetermined value (e.g., 1.2), it may be determined that the swing operation is performed. The sound effect that starts to be output at the time t1 is output until, for example, a time t2.

Then, when the acceleration increases again from a time t3 to a time t4, and the amount of increase exceeds a threshold, the sound effect is output at the time t4. When the amount of increase in the acceleration at a time t5 during the output of the sound effect further exceeds the threshold, the sound effect that is being output is stopped, and the sound effect newly starts to be reproduced at the time t5. From the time t5 to a time t6, the sound effect is output.

Next, when the amount of increase in the acceleration from a time t7 to a time t8 exceeds the threshold, the sound effect starts to be reproduced at the time t8. When the twist operation is performed on the ring controller at the time t8, the reproduction speed of the sound effect is set in accordance with the twist amount. For example, the reproduction speed is set such that the greater the twist amount, the smaller the reproduction speed. When the twist amount changes during the reproduction of the sound effect, the reproduction speed of the sound effect also changes. In the example of FIG. 23, from the time t8 to a time t9, the twist operation continues to be performed, the reproduction speed during this time is set to be smaller than the reproduction speed while the twist operation is not performed.

It should be noted that in the example of FIG. 23, when the swing operation is sensed, the reproduction speed of the sound effect is changed in accordance with the twist amount. Any change may be made so long as the sound effect to be output in accordance with the orientation of the controller is changed. For example, the musical interval of the sound effect, instead of the reproduction speed, may be changed in accordance with the twist amount and/or the tilt amount. Further, the type of the sound effect to be reproduced may be varied in accordance with the orientation of the controller.

Further, it may be detected by another method whether or not the swing operation is performed on the ring controller. For example, when the absolute value of the acceleration exceeds a predetermined threshold, the swing operation may be detected. Further, based on a change in the orientation of the ring controller, the swing operation may be detected. For example, when the amount of change in the tilt amount or the twist amount per unit time exceeds a threshold, the swing operation may be detected.

Figure 24:
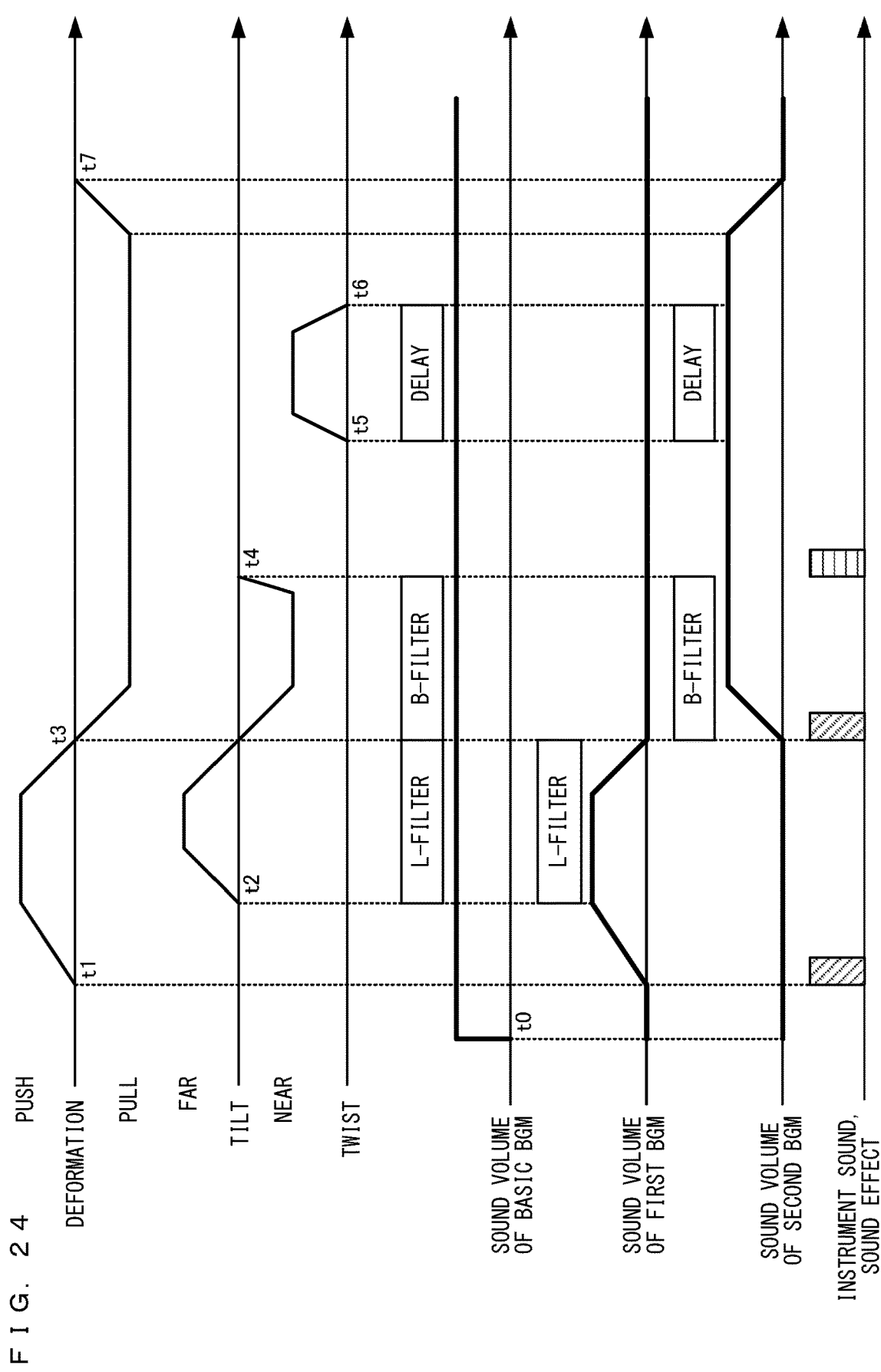
FIG. 24 is a diagram showing a non-limiting example of sounds to be output in accordance with the plurality of operations on the ring controller.

With reference to FIG. 24, a description is given of an example of music to be output by performing the processes of steps S1 to S5 in FIG. 18. FIG. 24 is a diagram showing examples of sounds to be output in accordance with the plurality of operations on the ring controller.

As shown in FIG. 24, at a time t0, the first game scene is started, and the basic BGM starts to be reproduced and output. At the time t0 and after that, the basic BGM is continuously reproduced and output. At the time t0, the first BGM and the second BGM also start to be reproduced. As described above, the basic BGM, the first BGM, and the second BGM are music having the same melody and are pieces of music having different types of timbre. These three pieces of BGM simultaneously start to be reproduced and are reproduced at the same speed after that. At the time t0, however, the operation of deforming the ring controller (the push-in operation or the pull operation) is not performed. Thus, the first BGM and the second BGM are reproduced, but the sound volumes of the first BGM and the second BGM are set to "0". Thus, the first BGM and the second BGM are not output from the speakers.

Next, when the push-in operation is performed on the ring controller at a time t1, the first BGM starts to be output, superimposed on the basic BGM. Specifically, the sound volume of the first BGM that is being reproduced is set to a value greater than "0". Consequently, an acoustic effect based on the first BGM is applied. Since the three pieces of BGM are simultaneously start to be reproduced at the time t0, when the first BGM is output at the time t1, a sound at the same time as the basic BGM is output. For example, when the time t1 is five seconds after the time t0, the sounds of the basic BGM and the first BGM at five seconds after the beginning are output at the time t1. Consequently, the sounds of the same music at the same time are output with different types of timbre.

While the push-in operation is continued, the first BGM is continuously output. As described above, the sound volume of the first BGM is set in accordance with the push-in amount. Further, at the time t1 when the push-in operation is detected, an instrument sound starts to be reproduced and output. Consequently, an acoustic effect based on the instrument sound is further applied. The instrument sound is selected in accordance with the orientation of the ring controller at the time t1.

When the tilt operation is performed on the ring controller in the far direction at a time t2, the low-pass filter (an L-filter) is applied to the basic BGM and the first BGM that are being output. Consequently, an acoustic effect based on the L-filter is applied to the basic BGM and the first BGM. As described above, the filter value of the L-filter is set in accordance with the push-in amount and the tilt amount. When the push-in amount changes to "0" and the tilt amount also changes to "0" at a time t3, the output of the first BGM and the application of the L-filter end. Specifically, the first BGM continues to be reproduced, but the sound volume is set to "0".

From the time t3, the pull operation is started instead of the push-in operation, and the tilt operation in the near direction is performed by the user. At the time t3 and after that, the sound volume of the second BGM is set to a value greater than "0", and the second BGM is continuously output. Further, at the time t3, the pull operation is detected. Consequently, at the time t3, an instrument sound corresponding to the orientation of the ring controller is reproduced and output. Further, at the time t3 and after that, while the tilt operation in the near direction is performed, the bandpass filter (a B-filter) is applied to the basic BGM and the second BGM. Consequently, an acoustic effect based on the B-filter is applied to the basic BGM and the second BGM.

Next, at a time t4, the tilt operation in the near direction ends. In accordance with this, the application of the B-filter ends. Further, when the swing operation is detected at the time t4, a sound effect starts to be reproduced and output. Consequently, an acoustic effect based on the sound effect is further applied.

Then, when the twist operation is performed on the ring controller from a time t5 to a time t6, the delay process is performed on the basic BGM and the second BGM that are being output. Consequently, an acoustic effect based on the delay is applied to the basic BGM and the second BGM. Then, at a time t7, in accordance with the fact that the pull operation ends, the output of the second BGM ends. Specifically, the second BGM continues to be reproduced, but the sound volume of the second BGM is set to "0".

It should be noted that while the push-in operation or the pull operation is not performed, the first BGM or the second BGM may not be reproduced. Then, when the push-in operation or the pull operation is performed, the first BGM or the second BGM may start to be reproduced. In this case, when the push-in operation or the pull operation is performed, the first BGM or the second BGM may start to be reproduced from the same time as the reproduction time of the basic BGM. For example, at the time t0, only the basic BGM starts to be reproduced, and when the push-in operation is performed at the time t1 five seconds after the time t0, the first BGM may start to be reproduced from five seconds after the beginning.

Further, in the exemplary embodiment, when the user stamps their foot, the third BGM and/or the fourth BGM are output. The third BGM and the fourth BGM are pieces of music having a melody similar to that of the basic BGM and are pieces of music having types of timbre different from those of the basic BGM, the first BGM, and the second BGM. Based on output from the acceleration sensor 104 and the angular velocity sensor 105 of the leg controller (the left controller 3), the main body apparatus 2 can distinguish the motion of the leg controller and determine whether or not the user stamps their foot. Specifically, similarly to the first BGM and the second BGM, the third BGM and the fourth BGM start to be reproduced simultaneously with the start of the reproduction of the basic BGM. When the user does not stamp their foot, the sound volumes of the third BGM and the fourth BGM are set to zero. Thus, the third BGM and the fourth BGM are not output. When the user stamps their foot, the sound volume of the third BGM increases in accordance with the stamping speed (the speed of moving up and down the foot). Further, when the stamping speed exceeds a threshold, control is performed so that the sound volume of the fourth BGM rapidly changes from zero to maximum. Further, every time a stamping action is performed, a sound effect (e.g., a human voice) is output, and the sound volume of the sound effect increases in accordance with the stamping speed. As described above, a different piece of BGM and a different sound effect are further added in accordance with the motion of the leg controller.

It should be noted that in the above description, when the first game scene is started, the basic BGM is automatically reproduced, and music including the basic BGM is output in accordance with an operation on the ring controller. In another exemplary embodiment, music may be output when the user stamps their foot. For example, the basic BGM may be reproduced when the first game scene is started, and the user stamps their foot. When an operation on the ring controller is performed while the basic BGM is reproduced, as described above, the first or second BGM having the same melody is added, or an instrument sound is added, or the filter process or the delay process is performed. As described above, when the user stamps their foot and performs an operation on the ring controller, music may be output.

That is, music may be generated and output based on information regarding the motion of the leg controller (a change in the orientation, the acceleration, or the like) in addition to the deformation information and the orientation information corresponding to the operations on the ring controller.

(Control of Output of Sounds in Second Game Scene)

Next, control of output of sounds in a second game scene is described. In the second game scene, the frequency (musical interval) of a predetermined sound is changed based on the operations on the ring controller. The second game scene may be a game scene different from the first game scene, and for example, may be an opening scene at the start of the game.

Figure 25:
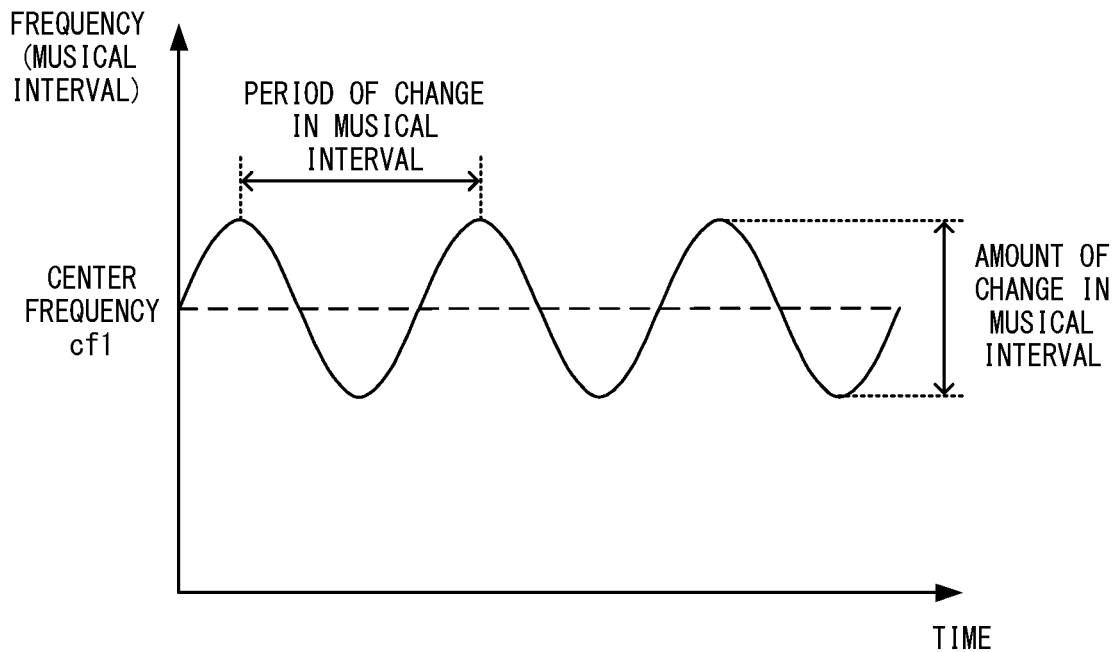
FIG. 25 is a diagram showing a non-limiting example of a change in the frequency of a predetermined sound in a case where the pull operation is performed on the ring controller.
Figure 26:
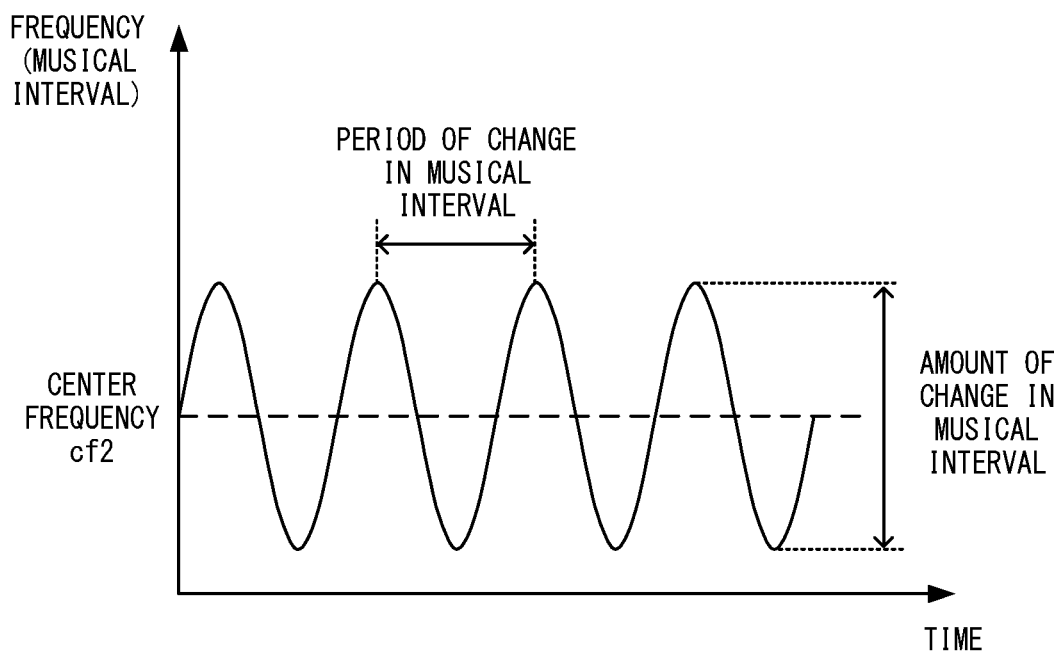
FIG. 26 is a diagram showing a non-limiting example of a change in the frequency of the predetermined sound output when a pull amount, a twist amount, and a tilt amount are different from those in FIG. 25 in a case where the pull operation is performed on the ring controller.

FIG. 25 is a diagram showing an example of a change in the frequency of a predetermined sound in a case where the pull operation is performed on the ring controller. FIG. 26 is a diagram showing an example of a change in the frequency of the predetermined sound output when the pull amount, the twist amount, and the tilt amount are different from those in FIG. 25 in a case where the pull operation is performed on the ring controller.

In the second game scene, a predetermined sound is output. The predetermined sound may be, for example, a sound with a sine wave having a certain frequency. Further, the predetermined sound may be a sound (e.g., music) composed of a plurality of frequency components. The following description is given on the assumption that the predetermined sound is a sound with a sine wave having a certain frequency.

The predetermined sound is output while the pull operation is performed on the ring controller, and is not output while the pull operation is not performed. Alternatively, in the second game scene, the predetermined sound may be output even when the pull operation is not performed on the ring controller. The frequency (musical interval) of the predetermined sound changes based on the pull amount, the twist amount, and the tilt amount.

Specifically, as shown in FIG. 25, when the ring controller is pulled by a certain pull amount (pull strength), the frequency of the predetermined sound periodically changes, centered on a center frequency cf1. For example, if the waveform of the predetermined sound is a sine wave, and the frequency of the predetermined sound is 100 kHz, the frequency of the predetermined sound periodically changes, for example, between 80 kHz to 120 kHz centered on 100 kHz. Here, the range (amplitude; 120−80=40 kHz) of the change in the frequency is occasionally referred to as "the amount of change in the musical interval". Further, the time from when the frequency is the highest to when the frequency is the highest next time is occasionally referred to as "the period of change in the musical interval". When the frequency of the predetermined sound periodically changes as shown in FIG. 25, the predetermined sound changes in an undulating manner.

The center frequency of the predetermined sound is set in accordance with the pull amount of the ring controller. Specifically, the greater the pull amount of the ring controller, the lower the center frequency of the predetermined sound. FIG. 26 shows a change in the predetermined sound when the ring controller is pulled more strongly than in FIG. 25. As shown in FIG. 26, a center frequency cf2 is lower than the center frequency cf1 in FIG. 25.

The amount of change in the musical interval (amplitude) is calculated based on the pull amount, the tilt amount, and the twist amount. Specifically, the amount of change in the musical interval is calculated based on the sum of a value corresponding to the absolute value of the pull amount, a value corresponding to the absolute value of the tilt amount, and a value corresponding to the absolute value of the twist amount. Thus, the greater the pull amount, the greater the amount of change in the musical interval. Then, the range of the change in the frequency widens. Further, the greater the tilt amount, the greater the amount of change in the musical interval. Further, the greater the twist amount, the greater the amount of change in the musical interval. It should be noted that the influences of the pull amount, the tilt amount, and the twist amount on the amount of change in the musical interval are relatively different from each other. For example, the influence of the pull amount on the amount of change in the musical interval may be smaller than the influences of the tilt amount and the twist amount on the amount of change in the musical interval.

Further, the period of change in the musical interval is also calculated based on the pull amount, the tilt amount, and the twist amount. Specifically, the sum of a value corresponding to the absolute value of the tilt amount and a value corresponding to the absolute value of the twist amount is calculated. The period of change in the musical interval is calculated based on the product of this sum and a value corresponding to the absolute value of the pull amount. Thus, the greater the pull amount, the faster the period (the shorter the time of one period). Further, the greater the tilt amount, the faster the period. Further, the greater the twist amount, the faster the period. For example, the period of change in the musical interval changes, for example, between 0.5 seconds and 10 seconds.

It should be noted that the sound volume of the predetermined sound may change in accordance with the pull amount. For example, the greater the pull amount, the greater the sound volume of the predetermined sound.

Figure 27:
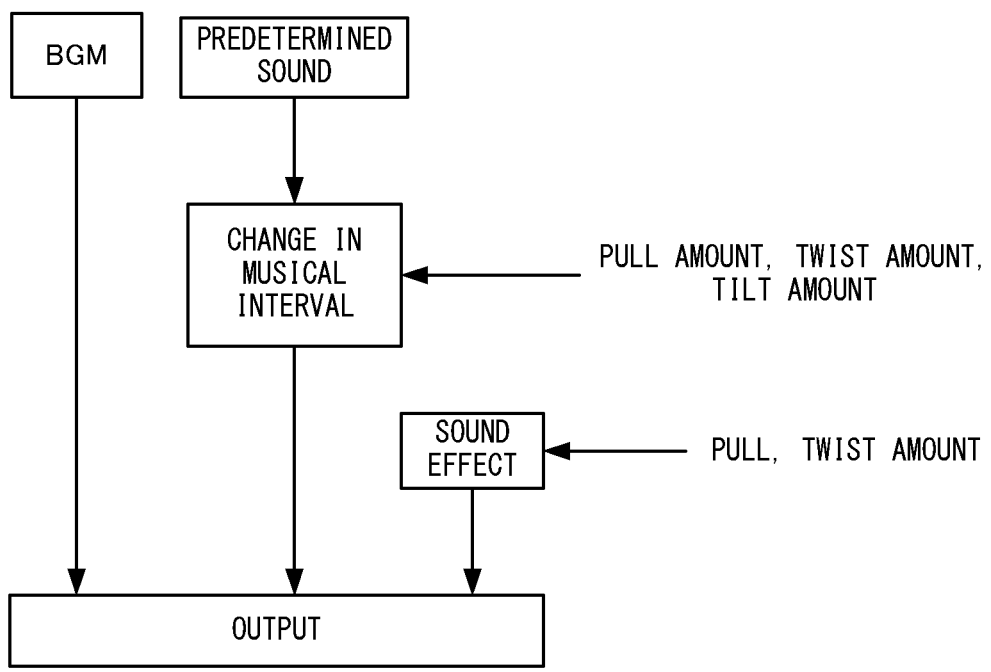
FIG. 27 is a diagram showing a non-limiting overview of the output of sounds based on the operations on the ring controller in a second game scene.

FIG. 27 is a diagram showing an overview of the output of sounds based on the operations on the ring controller in the second game scene.

In the second game scene, the predetermined sound is superimposed on predetermined BGM. The predetermined BGM is continuously output even when the operations on the ring controller are not performed in the second game scene. As shown in FIG. 27, unlike the predetermined sound, the predetermined BGM does not change based on the pull amount, the tilt amount, and the twist amount. While the pull operation is performed on the ring controller, as described above, the predetermined sound of which the musical interval changes is output, superimposed on the predetermined BGM.

Further, every time the pull operation on the ring controller is detected, a predetermined sound effect is output only once. The sound volume of the sound effect is set in accordance with the pull speed. Further, there are a plurality of types of sound effects. The sound effect to be output is determined in accordance with the orientation (e.g., the twist amount) of the ring controller when the pull operation is detected.

It should be noted that the above process regarding a change in the musical interval may be performed on BGM. For example, BGM may be controlled based on the pull amount, the twist amount, and the tilt amount so that the musical interval of the BGM periodically changes.

Further, the above process regarding a change in the musical interval may be performed on a sound effect.

Further, in the above description, when the pull operation is performed, the process regarding a change in the musical interval is performed. Alternatively, also when the push-in operation is performed, a similar process may be performed.

Further, the process regarding a change in the musical interval may be performed also in the first game scene. In this case, for example, the process regarding a change in the musical interval may be performed on the basic BGM. Further, the process regarding a change in the musical interval may be performed on the first BGM or the second BGM in addition to (or instead of) the basic BGM. Further, the process regarding a change in the musical interval may be performed on an instrument sound or a sound effect to be output in the first game scene.

As described above, in the game according to the exemplary embodiment, based on the deformation information (the push-in amount or the pull amount) corresponding to the deformation of the ring controller and the orientation information (the tilt amount or the twist amount) regarding the ring controller, a sound is output.

Specifically, in the first game scene, based on the deformation information, music obtained by adding as an acoustic effect a different piece of BGM having the same melody to the basic BGM is output. Further, based on the deformation information and the orientation information, the filter process or the delay process is performed on BGM (the basic BGM and added BGM), whereby an acoustic effect is applied. Further, based on the deformation information and the orientation information, an instrument sound as an acoustic effect is added. Further, when the swing operation is performed, a sound effect corresponding to the orientation information is added as an acoustic effect.

Further, in the second game scene, based on the deformation information (the pull amount) and the orientation information (the tilt amount or the twist amount), the process of changing the musical interval is performed as an acoustic effect. Then, a sound to which the acoustic effect is applied (a predetermined sound subjected to the process of changing the musical interval) is output.

As described above, in the game according to the exemplary embodiment, it is possible to apply to a basic sound an acoustic effect based on the deformation information and the orientation information regarding the ring controller (the addition of the first BGM, the addition of the second BGM, the filter process, the delay process, the addition of an instrument sound or a sound effect, a change in the musical interval, or the like) and output the sound to which the acoustic effect is applied. Consequently, by deforming the ring controller or changing the orientation of the ring controller, it is possible to output various sounds.

In the exemplary embodiment, an acoustic effect such as a filter or a delay is applied based on not only the orientation information regarding the ring controller but also the deformation information. Thus, it is possible to prevent an acoustic effect unintended by the user from being applied. That is, an acoustic effect such as a filter, a delay, or an instrument sound is not applied only by the orientation of the ring controller changing, and an acoustic effect is applied when the ring controller is deformed. Thus, it is possible to prevent an acoustic effect unintended by the user from being applied. For example, in the state where the ring controller is placed without being held by the user in the state where the ring controller is shifted from the reference orientation, it is possible to prevent an acoustic effect unintended by the user from being applied based on the orientation information. It should be noted that also in the swing determination, an acoustic effect may be applied only when the ring controller deforms.

Further, an acoustic effect is added based on the deformation amount (the push-in amount or the pull amount) and the orientation information (the twist amount or the tilt amount) of the ring controller. Thus, the following effects are obtained. For example, it is also possible that when the push-in operation is simply detected, a filter or a delay is added in accordance with the twist amount or the tilt amount at this time. Since the orientation of the ring controller can be easily changed, the user may excessively twist or excessively tilt the ring controller. For example, in a case where the user performs the push-in operation on the ring controller when excessively tilting the ring controller, a filter having a great filter value may be applied, and an uncomfortable acoustic effect may be applied. In the exemplary embodiment, however, an acoustic effect is added based on not only the fact that the push-in operation is simply detected, but also the product of the amount of the push-in operation and the orientation information. Thus, it is possible to apply an acoustic effect by reflecting the intention of the user more. For example, when the push-in operation is performed in the state where the ring controller is tilted, and even when the tilt amount is excessive, the push-in amount is small at first. Thus, a filter effect having a relatively small filter value starts to be applied. Thus, after that, it is easy for the user to obtain an intended filter effect while adjusting the tilt amount and the push-in amount. Further, to apply a relatively great filter, the user performs the push-in operation (or the pull operation) with a relatively great force and also performs the tilt operation. Conversely, to apply a relatively small filter, the user performs the push-in operation (or the pull operation) with a relatively small force and also performs the tilt operation. As described above, an acoustic effect is applied based on the deformation amount of the ring controller, whereby it is possible to apply an acoustic effect as intended by the user. It should be noted that the "product" as used herein may be a pure multiplication between the deformation information (the deformation amount) and the orientation information, or may not be a pure multiplication including another variable or another calculation process so long as a calculation process regarding a product for substantially obtaining these effects is included.

Further, an acoustic effect is applied in accordance with the product of the deformation information and the orientation information. Thus, it is possible to apply the same acoustic effect also by various operations. It is possible to increase the degree of freedom in an operation of the user. For example, the product is the same in a case where the deformation amount is made small, and the twist amount or the tilt amount is made great, and in a case where the deformation amount is made great, and the twist amount or the tilt amount is made small. Thus, for example, even when the deformation amount is small, it is possible to make the product great by making the twist amount or the tilt amount great. Thus, for example, by making the twist amount or the tilt amount great, even a physically weak user can add a relatively great filter or delay.

Further, while the ring controller deforms, the first BGM or the second BGM is added. Thus, the user can enjoy music while applying a force to the ring controller.

Further, when the push-in operation or the pull operation is detected, an instrument sound is output. Thus, when the push-in operation or the pull operation is repeatedly performed, the instrument sound is output each time. Consequently, it is possible to cause the user to repeatedly perform the push-in operation or the pull operation and cause the user to play an instrument by exercise. Further, a different instrument sound is output in accordance with the orientation of the ring controller when the push-in operation or the pull operation is detected. Thus, it is possible to cause the user to perform the push-in operation or the pull operation while changing the orientation of the ring controller. Consequently, interest increases as compared with a case where the push-in operation or the pull operation is simply repeated, and it is possible to cause the user to actively perform an operation (push-in, pull, twist, tilt, or the like) on the ring controller. Thus, it is possible to cause the user to exercise.

Further, the basic BGM is output, and a different sound (a different piece of BGM, or a different instrument sound, or the like) is added in accordance with the operation on the ring controller. Thus, the user performs an operation on the ring controller in time with the rhythm of the basic BGM and thereby can create original music. As described above, by fusing music and exercise, it is possible to improve interest and cause the user to actively exercise.

Further, the sound volume of the first BGM or the second BGM basically operates in conjunction with the push-in amount or the pull amount. However, when the push-in speed or the pull speed exceeds the threshold, the sound volume of the first BGM or the second BGM is maintained for a certain time. Thus, for example, even when the ring controller is instantaneously pushed in, the sound volume of the first BGM does not immediately change to zero, and the user can listen to the first BGM. Further, when the push-in operation or the pull operation is detected, an instrument sound is output. Thus, for example, by repeating an instantaneous push-in operation, the user can repeatedly output the instrument sound and also listen to the first BGM. That is, when the push-in speed exceeds the threshold in each push-in operation, the sound volume of the first BGM is maintained for the certain time. Thus, the user can listen to both the first BGM and the instrument sound. For example, when the push-in operation and the pull operation are repeated in a short time as in FIG. 21, the first BGM and the second BGM are continuously output, and also when the push-in operation and the pull operation are detected, an instrument sound corresponding to the push-in operation or the pull operation (an instrument sound that differs in accordance with the orientation at this time) is output. Consequently, the user can further listen to the instrument sound corresponding to the push-in operation or the pull operation in addition to the first BGM and the second BGM and create and output music obtained by superimposing an instrument sound on BGM.

Further, music is output based on the motion of the leg controller in addition to the operations on the ring controller (the push-in operation, the pull operation, the tilt operation, and the twist operation). Thus, it is possible to cause the user to perform full-body exercise using their hands and feet.

(Details of Processing)

Next, an example of processing performed by the main body apparatus 2 is specifically described. First, data stored in the main body apparatus 2 is described.

Figure 28:
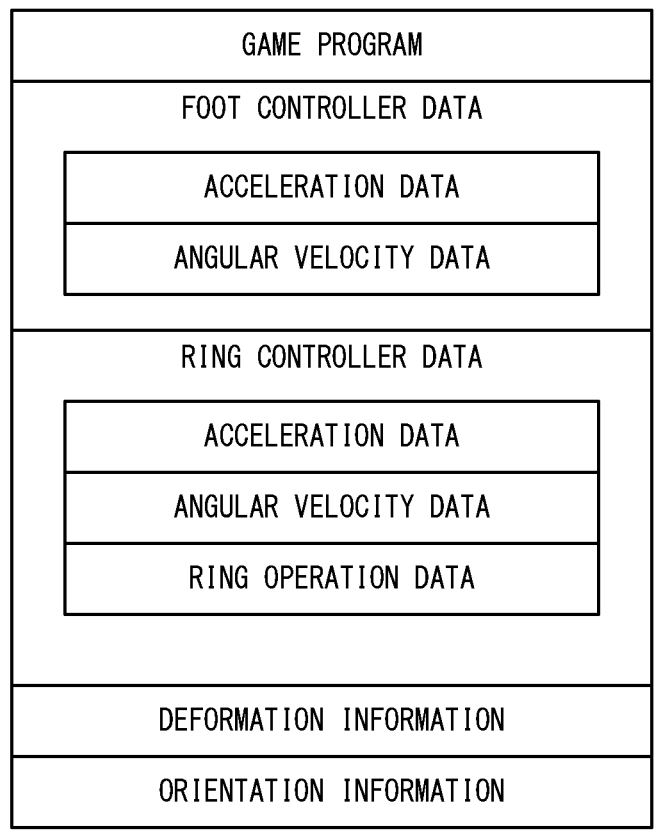
FIG. 28 is a diagram showing a non-limiting example of data stored in the main body apparatus 2.

FIG. 28 is a diagram showing an example of the data stored in the main body apparatus 2. The data shown in FIG. 28 is mainly stored in the DRAM 85. Alternatively, a part or all of the data may be stored in the flash memory 84, or may be stored in the external storage medium attached to the slot 23.

As shown in FIG. 28, in the main body apparatus 2, a game program, leg controller data, ring controller data, deformation information, and orientation information are stored. In addition to these pieces of data, sound data and various pieces of data necessary for game processing are stored.

The game program is a program for executing the game according to the exemplary embodiment and is a program for executing processing shown in flow charts described below. The game program is stored in, for example, the external storage medium or the flash memory 84 and loaded from the external storage medium or the flash memory 84 into the DRAM 85 when the game is started. It should be noted that the game program may be acquired from another apparatus via a network (e.g., a LAN, a WAN, the Internet, or the like).

The leg controller data is sensor data transmitted from the left controller 3 at predetermined time intervals (e.g., $1/200$-second intervals). Specifically, the leg controller data includes acceleration data from the acceleration sensor 104 and angular velocity data from the angular velocity sensor 105. The leg controller data includes the latest sensor data and a plurality of pieces of sensor data received in the past.

The ring controller data is sensor data transmitted from the right controller 4 at predetermined time intervals (e.g., $1/200$-second intervals). Specifically, the ring controller data includes acceleration data from the acceleration sensor 114, angular velocity data from the angular velocity sensor 115, and ring operation data regarding a strain value detected by the strain detector 211. The ring controller data includes the latest sensor data and a plurality of pieces of sensor data received in the past.

The deformation information is information regarding the deformation of the ring controller calculated based on the ring controller data. The deformation information is information representing the push-in amount (a positive strain value) or the pull amount (a negative strain value).

The orientation information is information regarding the orientation of the ring controller calculated based on the ring controller data. The orientation information includes the twist amount (the rotational angle about the z-axis) and the tilt amount (the rotational angle about the y-axis).

(Description of Flow Chart)

Figure 29:
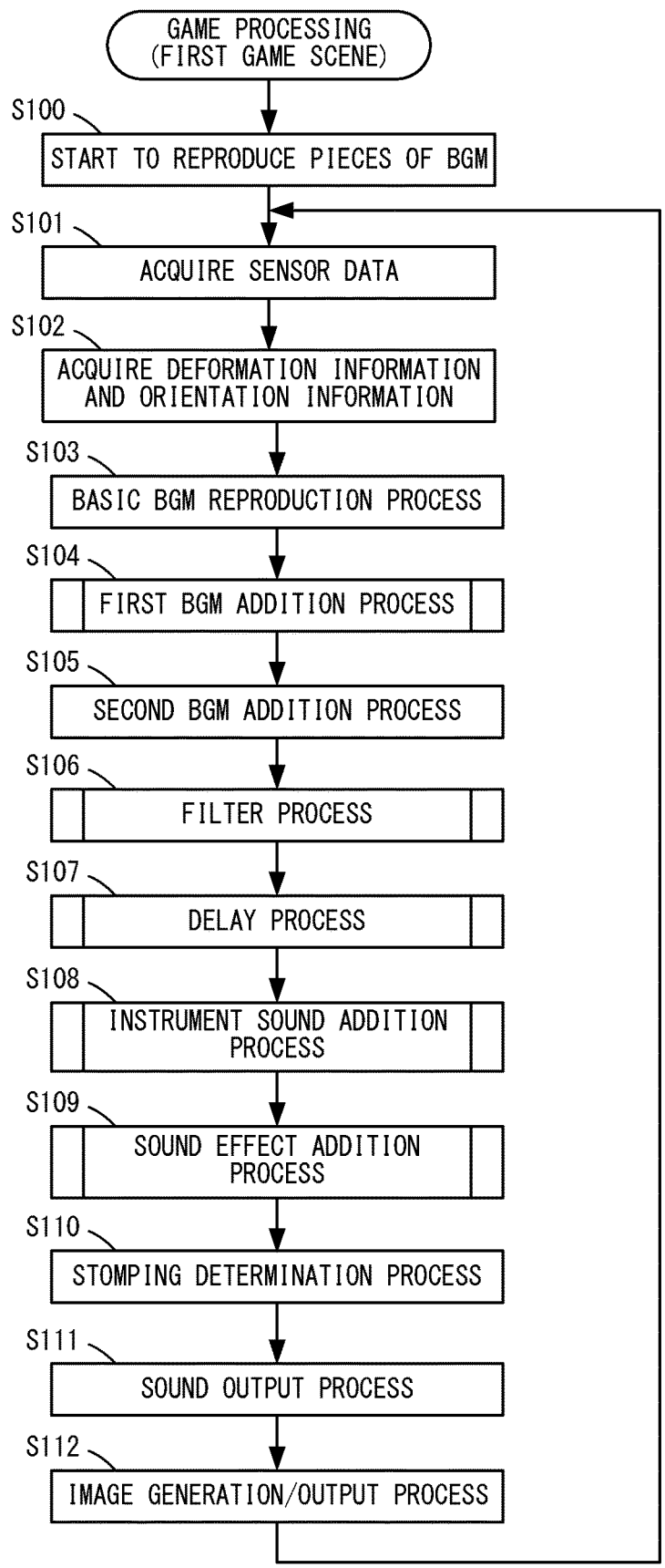
FIG. 29 is a flow chart showing a non-limiting example of game processing in the first game scene performed by a processor 81 of the main body apparatus 2.

Next, the details of the processing performed by the main body apparatus 2 are described. FIG. 29 is a flow chart showing an example of game processing in the first game scene performed by the processor 81 of the main body apparatus 2. The processing shown in FIG. 29 is started in accordance with the fact that the first game scene is started during the execution of the game.

As shown in FIG. 29, first, the processor 81 starts to reproduce pieces of BGM (basic BGM, first BGM, second BGM, third BGM, and fourth BGM) (step S100). After starting to reproduce the pieces of BGM in step S100, the processor 81 repeatedly executes the processes of steps S101 to S112 at predetermined frame time intervals (e.g., $1/60$-second intervals) until the first game scene ends. The processes of step S101 and after that are described below.

The processor 81 acquires sensor data (acceleration data, angular velocity data, and ring operation data) from the ring controller (step S101).

Next, based on the acquired sensor data, the processor 81 acquires deformation information and orientation information regarding the ring controller (step S102). Specifically, based on the ring operation data, the processor 81 acquires the push-in amount (a positive strain value) or the pull amount (a negative strain value). Further, based on the angular velocity data and the acceleration data of the ring controller, the processor 81 calculates the twist amount and the tilt amount as the orientation information.

Next, based on sound data corresponding to the basic BGM stored in advance, the processor 81 performs a basic BGM reproduction process (step S103). Consequently, when the reproduction position of the basic BGM started in step S100 is updated, and a sound output process in step S111 described below is performed, the basic BGM is output from the speakers (the speakers 88 of the main body apparatus 2 or another speaker). Further, similarly to the update of the reproduction position of the basic BGM, the reproduction positions of the first to fourth BGM are also updated. It should be noted that when a filter process and a delay process described below are performed on the basic BGM, the basic BGM to which acoustic effects of the filter process and the delay process are applied is output.

Subsequently, the processor 81 executes a first BGM addition process (step S104). The first BGM addition process is the process of adding the first BGM to the basic BGM in a superimposed manner when a push-in operation is performed on the ring controller. The details of the first BGM addition process in step S104 will be described below.

Next, the processor 81 executes a second BGM addition process (step S105). The second BGM addition process is the process of adding the second BGM to the basic BGM in a superimposed manner when a pull operation is performed on the ring controller. The second BGM addition process is a process similar to the first BGM addition process, except that the push-in operation is replaced by the pull operation.

Subsequently, based on the deformation information and the orientation information, the processor 81 performs a filter process (step S106). Specifically, when the push-in operation or the pull operation is performed on the ring controller, the processor 81 performs the filter process in accordance with the tilt amount of the ring controller. The details of the filter process in step S106 will be described below.

Next, based on the deformation information and the orientation information, the processor 81 performs a delay process (step S107). Specifically, when the push-in operation or the pull operation is performed on the ring controller, the processor 81 performs the delay process in accordance with the twist amount of the ring controller. The details of the delay process in step S107 will be described below.

Next, based on the deformation information and the orientation information, the processor 81 performs an instrument sound addition process (step S108). Specifically, when the push-in operation or the pull operation is performed on the ring controller, the processor 81 reproduces an instrument sound in accordance with the orientation information regarding the ring controller. The details of the instrument sound addition process in step S108 will be described below.

Further, the processor 81 performs a sound effect addition process (step S109). Specifically, when a swing operation is performed on the ring controller, the processor 81 reproduces a sound effect in accordance with the orientation information regarding the ring controller. The details of the sound effect addition process in step S109 will be described below.

After the process of step S109, the processor 81 performs a stamping determination process (step S110). Specifically, based on sensor data from the leg controller (data from the acceleration sensor and the angular velocity sensor), the processor 81 determines whether or not the user stamps their foot. Then, when it is determined that the user stamps their foot, the processor 81 sets the sound volumes of the third BGM and/or the fourth BGM to values greater than zero in accordance with the stamping speed of the user stamping their foot. When it is determined that the user does not stamp their foot, the processor 81 sets the sound volumes of the third BGM and the fourth BGM to zero. Further, the processor 81 reproduces a sound effect based on the result of the stamping determination.

After the process of step S110, the processor 81 performs a sound output process for outputting music data generated based on the results of the processes of steps S103 to S110 (step S111). Consequently, music based on the results of the processes of steps S103 to S110 is output from the speakers. For example, when the push-in operation is performed, the first BGM is added to the basic BGM in a superimposed manner. Further, when a tilt operation is performed in addition to the push-in operation, a sound obtained by performing the filter process on the basic BGM and the first BGM is output. Further, for example, when the push-in operation is detected in the current processing loop, an instrument sound is further added to the BGM in a superimposed manner. Further, when the swing operation is detected in the current processing loop, a sound effect is further added. Then, the processor 81 performs an image generation/output process (step S112). The processes of steps S111 and S112 are performed, whereby a game image regarding the first game scene is displayed, and music corresponding to the operations on the ring controller is also output. After the process of step S112, the processor 81 executes the process of step S101 again.

(First BGM Addition Process)

Figure 30:
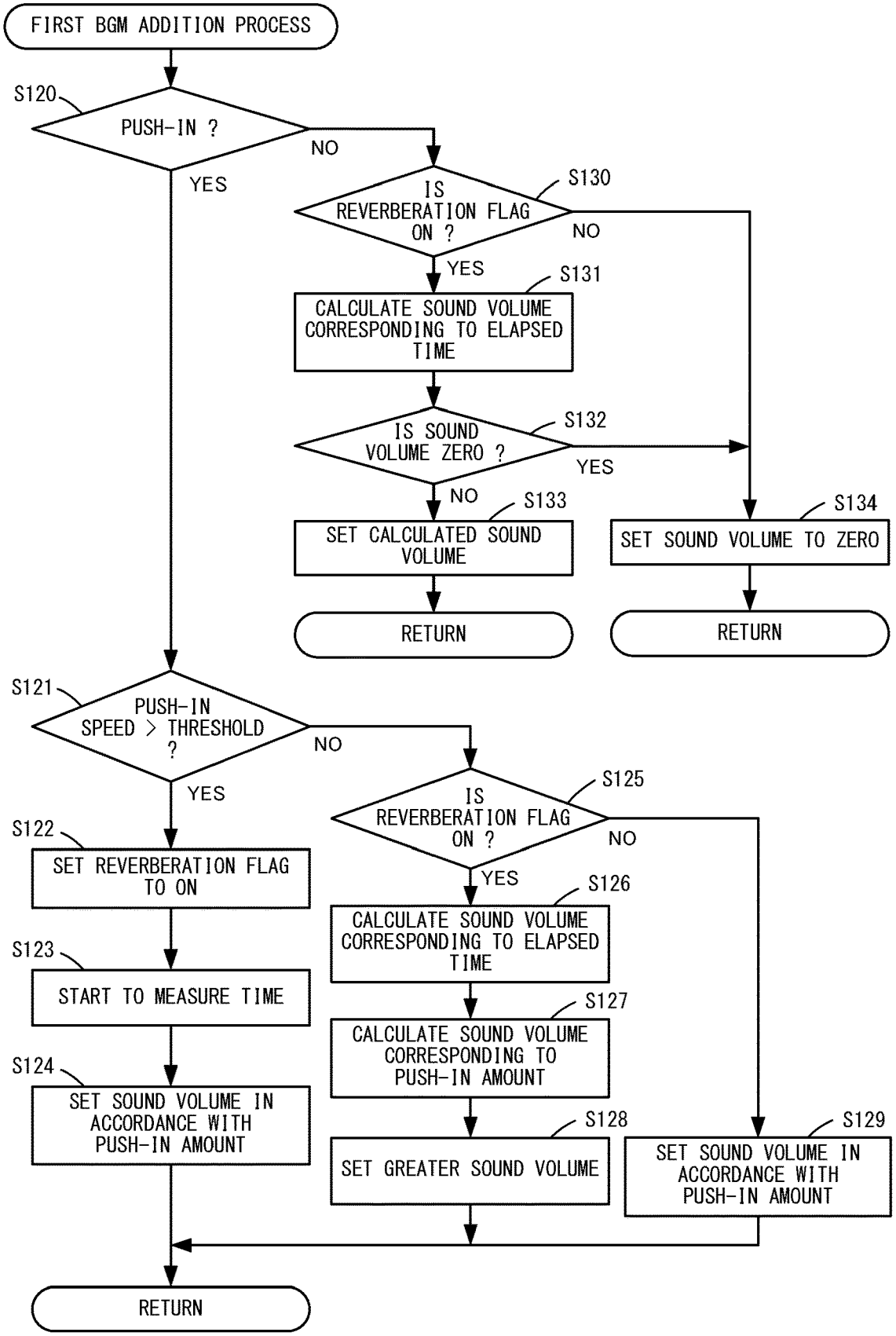
FIG. 30 is a flow chart showing a non-limiting example of a first BGM addition process in step S104.

Next, the details of the first BGM addition process in step S104 are described. FIG. 30 is a flow chart showing an example of the first BGM addition process in step S104.

First, the processor 81 determines whether or not the push-in operation is performed on the ring controller (step S120). Specifically, the processor 81 determines whether or not the strain value is greater than "0". When the strain value is greater than "0", it can be determined that the push-in operation is performed on the ring controller.

When the push-in operation is performed (step S120: YES), the processor 81 determines whether or not the push-in speed exceeds a threshold (step S121). For example, based on the push-in amount acquired in the previous processing loop and the push-in amount acquired in the current processing loop, the processor 81 determines whether or not the push-in amount increases. Then, when the push-in amount increases, the processor 81 determines whether or not the amount of increase exceeds a predetermined threshold.

When it is determined that the push-in speed exceeds the threshold (step S121: YES), the processor 81 sets a "reverberation flag" to ON (step S122). Here, the reverberation flag is a flag indicating that the push-in speed exceeds the threshold, and is a flag indicating that the sound volume of the first BGM is maintained for a predetermined time without operating in conjunction with the push-in amount and then decreases at a constant speed.

Next, the processor 81 starts to measure the time elapsed since the push-in speed exceeds the threshold (step S123). Then, the processor 81 sets the sound volume of the first BGM in accordance with the current push-in amount (step S124). The relationship between the push-in amount and the sound volume is determined in advance, and the sound volume of the first BGM is set in conjunction with the push-in amount.

On the other hand, when the push-in speed does not exceed the threshold (step S121: NO), the processor 81 determines whether or not the reverberation flag is ON (step S125).

When the reverberation flag is ON (step S125: YES), the processor 81 calculates a sound volume corresponding to the time elapsed since the push-in speed exceeds the threshold (step S126). Specifically, for example, when the elapsed time is less than or equal to 0.5 seconds, the processor 81 calculates the sound volume set in step S124. Further, when the elapsed time exceeds 0.5 seconds, the processor 81 calculates the sound volume obtained by, in accordance with the elapsed time, decreasing the sound volume set in step S124. For example, when the elapsed time exceeds 0.5 seconds, the sound volume is calculated so that the sound volume decreases in proportion to the elapsed time.

After step S126, the processor 81 calculates a sound volume corresponding to the current push-in amount (step S127). Then, the processor 81 sets as the sound volume of the first BGM the greater sound volume between the sound volume calculated in step S126 and the sound volume calculated in step S127 (step S128).

The processes of steps S126 to S128 are performed, whereby, when the push-in speed exceeds the threshold, the sound volume of the first BGM is maintained for the predetermined time and then changes by decreasing at the constant speed.

On the other hand, when the reverberation flag is OFF (step S125: NO), the processor 81 sets the sound volume of the first BGM in accordance with the current push-in amount (step S129). Consequently, the sound volume of the first BGM changes in conjunction with the push-in amount.

When the process of step S124, S128, or S129 is performed, the processor 81 ends the first BGM addition process shown in FIG. 30.

On the other hand, when the push-in operation is not performed (step S120: NO), i.e., when the strain value is less than or equal to "0", the processor 81 determines whether or not the reverberation flag is ON (step S130). When the reverberation flag is ON (step S130: YES), the processor 81 calculates a sound volume corresponding to the time elapsed since the push-in speed exceeds the threshold (step S131). The process of step S131 is a process similar to the process of step S126. Specifically, for example, when the elapsed time is less than or equal to 0.5 seconds, the processor 81 calculates the sound volume set in step S124. Further, when the elapsed time exceeds 0.5 seconds, the processor 81 calculates the sound volume obtained by, in accordance with the elapsed time, decreasing the sound volume set in step S124.

Next, the processor 81 determines whether or not the sound volume calculated in step S131 is zero (step S132). When the sound volume calculated in step S131 is not zero (step S132: NO), the processor 81 sets the calculated sound volume as the sound volume of the first BGM (step S133).

The processes of steps S131 to S133 are performed, whereby, when the push-in speed exceeds the threshold in the previous processing loop, and even when the push-in amount changes to less than or equal to zero, the sound volume of the first BGM is maintained for the predetermined time and then changes by decreasing at the constant speed. That is, when the push-in operation is performed, and the push-in speed exceeds the threshold, and then, even when the push-in operation is no longer performed or switches to the pull operation, the first BGM continues to be output for some time. Consequently, it is possible to provide a reverberation.

On the other hand, when the determination is NO in step S130, or when the determination is YES in step S132, the processor 81 sets the sound volume of the first BGM to zero (step 134). It should be noted that when the determination is YES in step S132, the processor 81 sets the reverberation flag to OFF.

When the process of step S133 or S134 is performed, the processor 81 ends the first BGM addition process shown in FIG. 30.

It should be noted that the second BGM addition process is similar to the first BGM addition process, except that "push-in" in FIG. 30 is replaced by "pull". Thus, the details of the second BGM addition process are not described.

(Filter Process)

Figure 31:
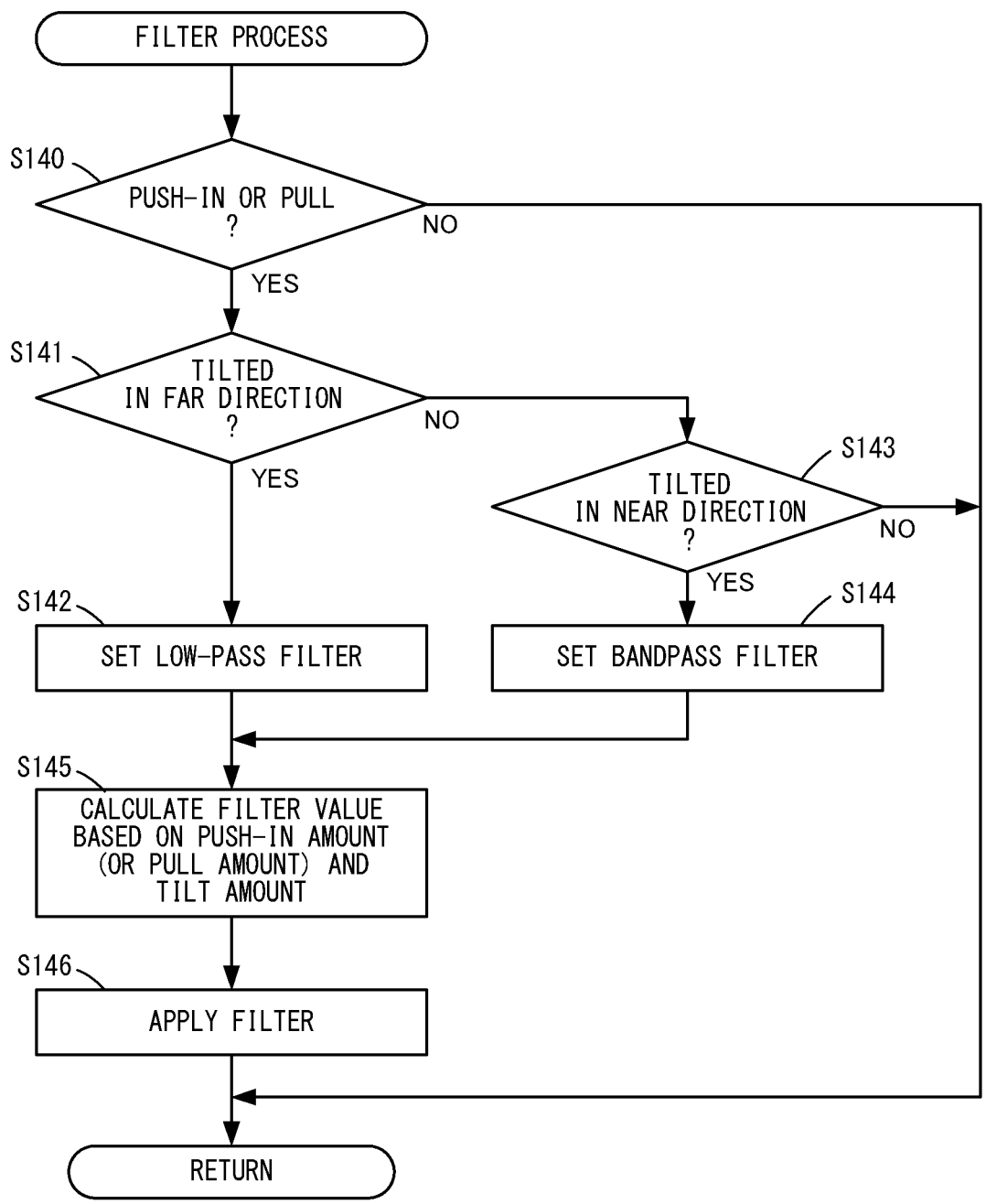
FIG. 31 is a flow chart showing a non-limiting example of a filter process in step S106.

Next, the details of the filter process in step S106 are described. FIG. 31 is a flow chart showing an example of the filter process in step S106.

The processor 81 determines whether or not the push-in operation or the pull operation is performed on the ring controller (step S140). Specifically, the processor 81 determines whether or not the strain value is a value other than zero.

When it is determined that the push-in operation or the pull operation is performed (step 140: YES), the processor 81 determines whether or not the ring controller is tilted in the far direction (step S141). For example, when the tilt amount is greater than zero, the processor 81 determines that the ring controller is tilted in the far direction.

When the ring controller is tilted in the far direction (step S141: YES), the processor 81 sets the low-pass filter (step S142). On the other hand, when the ring controller is not tilted in the far direction (step S141: NO), the processor 81 determines whether or not the ring controller is tilted in the near direction (step S143). For example, when the tilt amount is smaller than zero, the processor 81 determines that the ring controller is tilted in the near direction.

When the ring controller is tilted in the near direction (step S143: YES), the processor 81 sets the bandpass filter (step S144).

When the process of step S142 or S144 is executed, the processor 81 calculates the filter value based on the push-in amount or the pull amount and the tilt amount (step S145). For example, when the push-in operation is performed, the processor 81 calculates the filter value based on the product of the absolute value of the push-in amount and the absolute value of the tilt amount.

Then, the processor 81 applies the filter to the sound that is being reproduced (step S146). For example, when the low-pass filter is set, the processor 81 cuts or attenuates frequencies greater than or equal to a predetermined frequency based on the filter value calculated in step S145. Further, when the bandpass filter is set, the processor 81 cuts or attenuates frequencies outside a predetermined range based on the filter value calculated in step S145. Consequently, the filter is applied to the BGM (the basic BGM, the first BGM, and the second BGM), and how the BGM is heard changes.

When the process of step S146 is performed, or when the determination is NO in step S140, or when the determination is NO in step S143, the processor 81 ends the filter process shown in FIG. 31.

(Delay Process)

Figure 32:
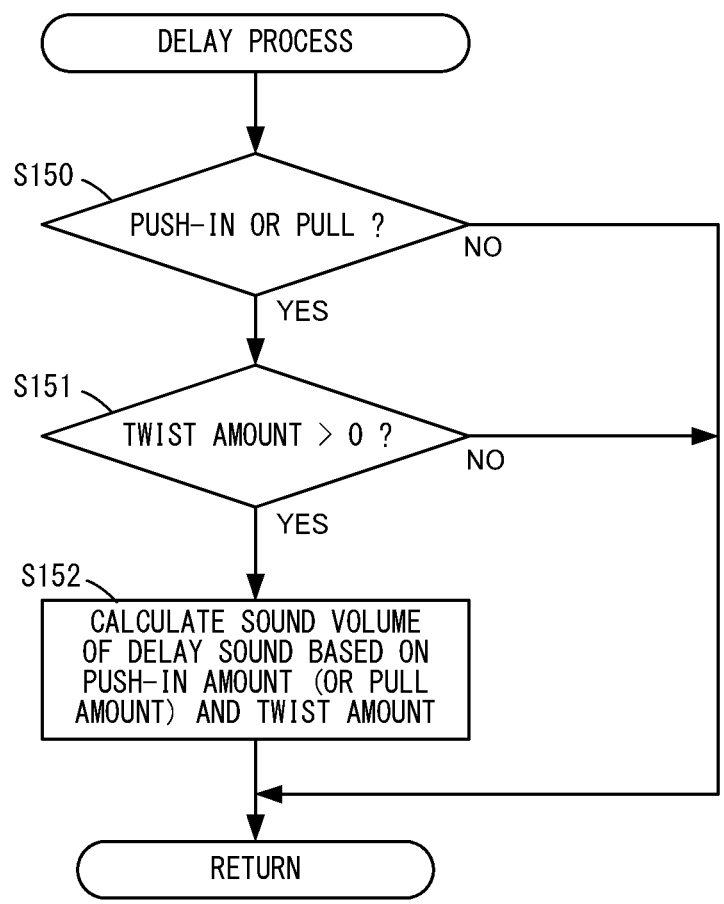
FIG. 32 is a flow chart showing a non-limiting example of a delay process in step S107.

Next, the details of the delay process in step S107 are described. FIG. 32 is a flow chart showing an example of the delay process in step S107.

The processor 81 determines whether or not the push-in operation or the pull operation is performed on the ring controller (step S150). Specifically, the processor 81 determines whether or not the strain value is a value other than zero.

When it is determined that the push-in operation or the pull operation is performed (step 150: YES), the processor 81 determines whether or not the twist amount of the ring controller is greater than zero (step S151).

When the twist amount is greater than zero (step S151: YES), the processor 81 calculates the sound volume of a delay sound based on the push-in amount or the pull amount and the twist amount (step S152). For example, when the push-in operation is performed, the processor 81 calculates the sound volume of the delay sound based on the product of the absolute value of the push-in amount and the absolute value of the twist amount. The process of step S152 is performed with respect to each piece of BGM to be output. That is, the sound volume of the delay sound corresponding to the basic BGM is calculated. Further, when the sound volume of the first BGM is greater than zero, the sound volume of the delay sound corresponding to the first BGM is calculated. Further, when the sound volume of the second BGM is greater than zero, the sound volume of the delay sound corresponding to the second BGM is calculated. Consequently, when the sound output process in step S111 is performed, a delay sound a predetermined time later than each piece of BGM is output.

It should be noted that when the determination is NO in step S150, or when the determination is NO in step S151, the sound volume of the delay sound is set to zero. Specifically, the process of reproducing the delay sound with respect to each piece of BGM is performed, but the delay sound of each piece of BGM is set to zero. Thus, the delay sound is not output.

When the process of step S152, or when the determination is NO in step S150, or when the determination is NO in step S151, the processor 81 ends the delay process shown in FIG. 32.

(Instrument Sound Addition Process)

Figure 33:
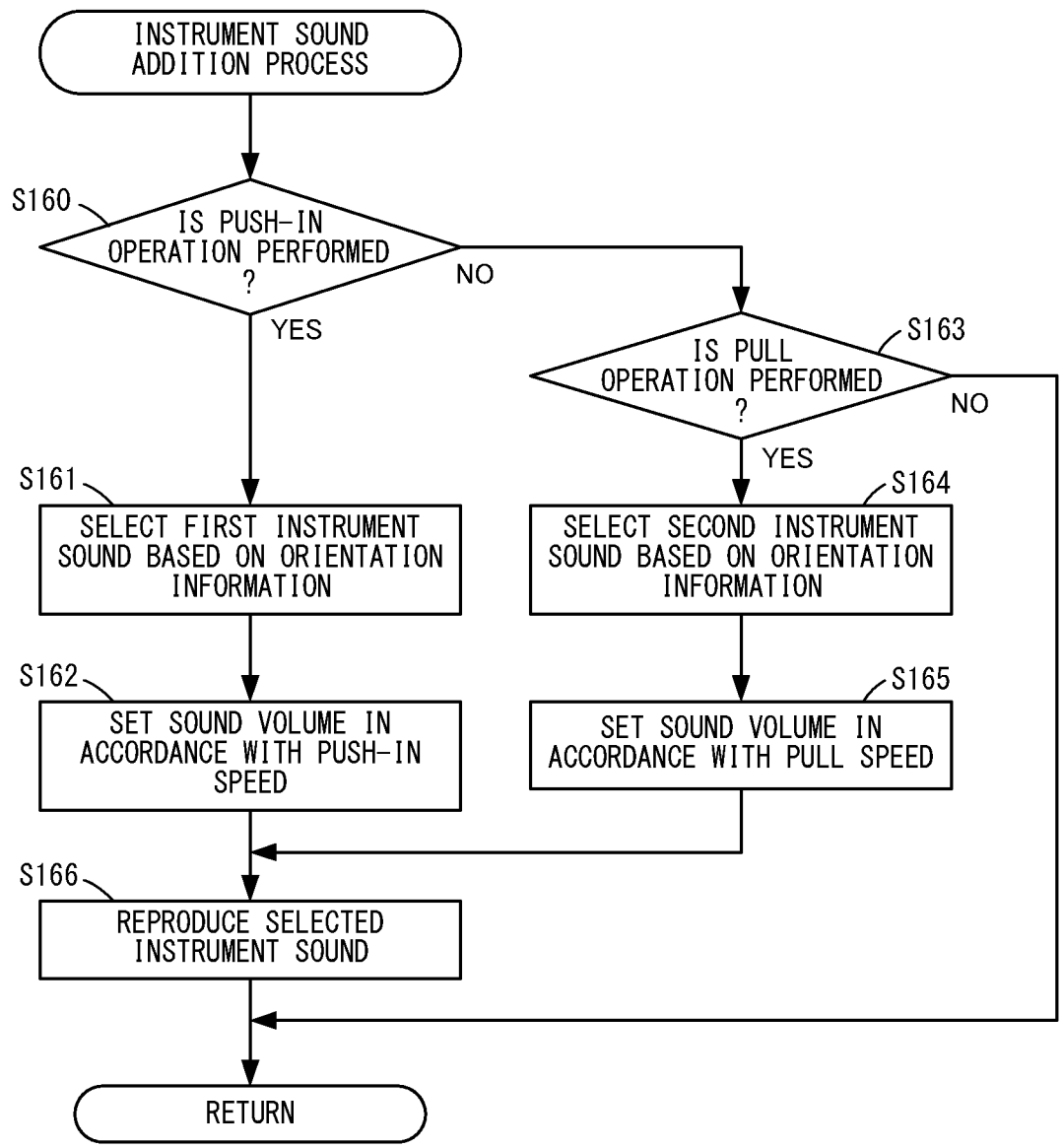
FIG. 33 is a flow chart showing a non-limiting example of an instrument sound addition process in step S108.

Next, the details of the instrument sound addition process in step S108 are described. FIG. 33 is a flow chart showing an example of the instrument sound addition process in step S108.

The processor 81 determines whether or not the push-in operation is performed on the ring controller (step S160). For example, when the state where a force is not applied to the ring controller or the state where the pull operation is performed shifts to the state where the push-in operation is performed, the processor 81 determines that the push-in operation is performed on the ring controller. Specifically, when the strain value in the previous processing loop is less than or equal to zero, and the strain value in the current processing loop is greater than zero (or a predetermined value), the processor 81 determines that the push-in operation is performed.

When it is determined that the push-in operation is performed (step S160: YES), the processor 81 selects a first instrument sound based on the orientation information (step S161). In the main body apparatus 2, a plurality of sounds are stored as the first instrument sound to be output when the push-in operation is performed. Based on the orientation information (the twist amount and/or the tilt amount) when the push-in operation is performed, the processor 81 selects any one of the plurality of first instrument sounds.

Next, the processor 81 sets the sound volume of the first instrument sound in accordance with the push-in speed (step S162). Specifically, the processor 81 sets the sound volume of the first instrument sound such that the greater the push-in speed, the greater the sound volume of the first instrument sound.

On the other hand, when it is determined that the push-in operation is not performed (step S160: NO), the processor 81 determines whether or not the pull operation is performed (step S163). For example, when the state where a force is not applied to the ring controller or the state where the push-in operation is performed shifts to the state where the pull operation is performed, the processor 81 determines that the pull operation is performed on the ring controller. Specifically, when the strain value in the previous processing loop is greater than or equal to zero, and the strain value in the current processing loop is smaller than zero (or a predetermined value), the processor 81 determines that the pull operation is performed.

When it is determined that the pull operation is performed (step S163: YES), the processor 81 selects a second instrument sound based on the orientation information (step S164). In the main body apparatus 2, a plurality of sounds are stored as the second instrument sound to be output when the pull operation is performed. Based on the orientation information (the twist amount and/or the tilt amount) when the pull operation is performed, the processor 81 selects any one of the plurality of second instrument sounds.

Next, the processor 81 sets the sound volume of the second instrument sound in accordance with the pull speed (step S165). Specifically, the processor 81 sets the sound volume of the second instrument sound such that the greater the pull speed, the greater the sound volume of the second instrument sound.

When the process of step S162 or S165 is performed, the processor 81 starts to reproduce the selected instrument sound with the set sound volume (step S166).

When the process of step S166 is executed, or when the determination is NO in step S163, the processor 81 ends the instrument sound addition process shown in FIG. 33.

(Sound Effect Addition Process)

Figure 34:
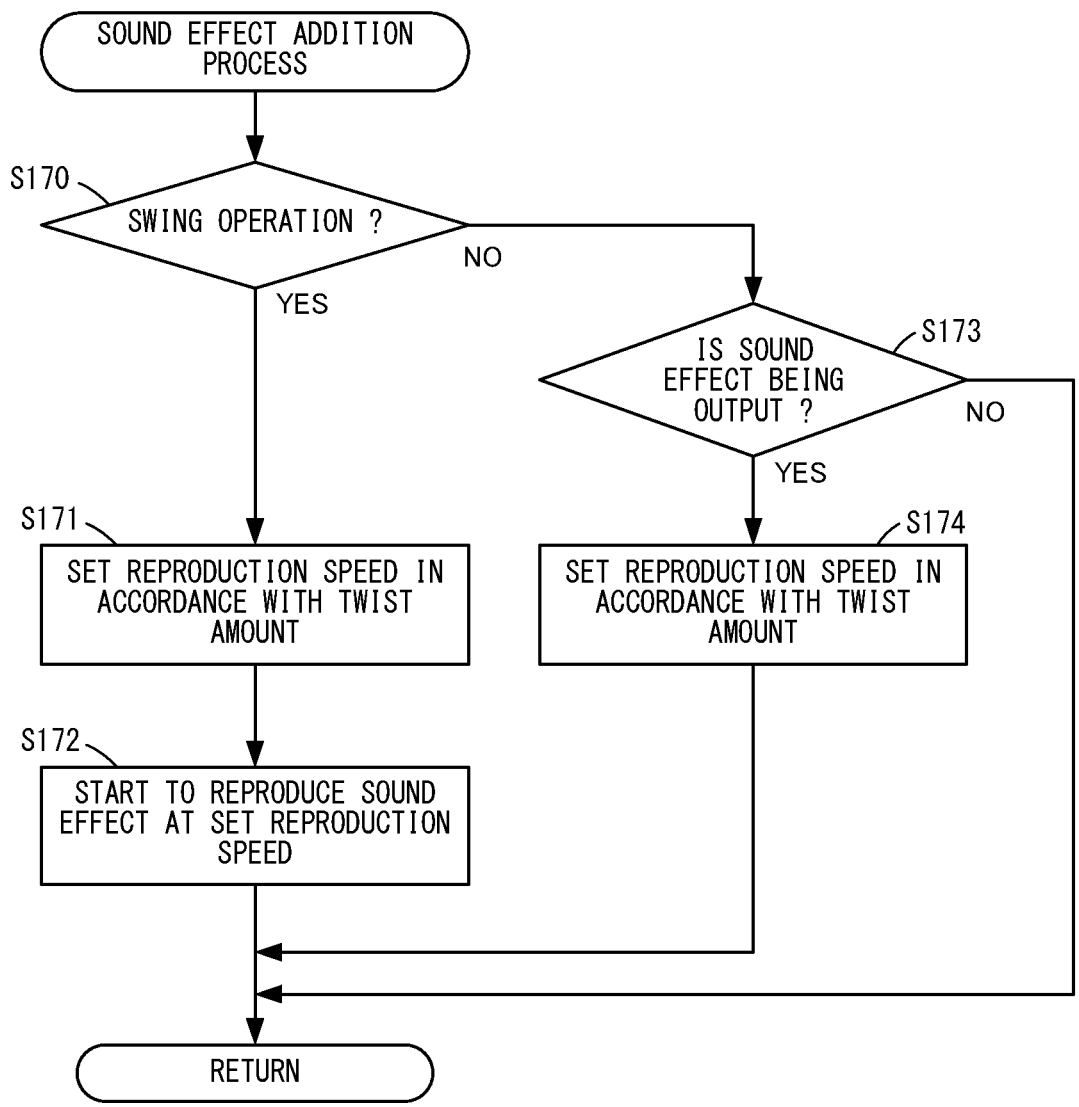
FIG. 34 is a flow chart showing a non-limiting example of a sound effect addition process in step S109.

Next, the details of the sound effect addition process in step S109 are described. FIG. 34 is a flow chart showing an example of the sound effect addition process in step S109.

The processor 81 determines whether or not the swing operation is performed on the ring controller (step S170). Specifically, based on output from the acceleration sensor 114, the processor 81 determines whether or not the swing operation is performed. For example, when a value obtained by dividing the magnitude of an acceleration vector in the current processing loop by the magnitude of the acceleration vector in the previous processing loop exceeds a threshold, the processor 81 determines that the swing operation is performed.

When it is determined that the swing operation is performed (step S170: YES), the processor 81 sets the reproduction speed of a sound effect in accordance with the twist amount (step S171). For example, when the twist amount is zero, the processor 81 sets the reproduction speed to a normal reproduction speed. Further, when the twist amount has a positive value, the processor 81 sets the reproduction speed to be greater than normal. When the twist amount has a negative value, the processor 81 sets the reproduction speed to be smaller than normal.

Next, the processor 81 starts to reproduce the sound effect at the reproduction speed set in step S171 (step S172). It should be noted that when the sound effect starts to be reproduced in step S172 in the previous processing loop, and while the sound effect is being reproduced, the processor 81 stops the sound effect that is being reproduced, and in step S172 in the current processing loop, the processor 81 newly starts to reproduce the sound effect.

On the other hand, when it is not determined that the swing operation is performed (step S170: NO), the processor 81 determines whether or not the sound effect already starts to be reproduced in the previous processing loop, and the sound effect is being output (step S173). When it is determined that the sound effect is being output (step S173: YES), the processor 81 sets the reproduction speed of the sound effect in accordance with the twist amount (step S174). Consequently, when the orientation of the ring controller changes during the reproduction of the sound effect, the reproduction speed of the sound effect also changes.

When the process of step S172 is executed, or when the process of step S174 is executed, or when the determination is NO in step S173, the processor 81 ends the sound effect addition process shown in FIG. 34.

It should be noted that the processes shown in the above flow charts are merely illustrative, and the order, the contents, and the like of the processes may be appropriately changed.

For example, the filter process in step S106 and the delay process in step S107 may be performed after the process of step S109. In this case, the filter process and the delay process are also performed on the instrument sound and the sound effect in addition to the BGM (the basic BGM, the first BGM, and the second BGM). Further, the stamping determination process in step S110 may be performed before the filter process in step S106. In this case, the filter process and the delay process are performed on the third BGM and/or the fourth BGM to be output when the user stamps their foot.

Further, the thresholds used for the determinations are merely illustrative, and may be appropriately changed. For example, to prevent erroneous detection, the thresholds used for the determinations may have some ranges. For example, in the determination of whether or not the push-in operation is performed, instead of determining whether or not the strain value is greater than zero, it may be determined whether or not the strain value is greater than a predetermined value (>0). Similarly, the thresholds for the determinations regarding the twist amount and the tilt amount may also have some ranges.

Further, some of the processes may be omitted, or another process may be added. For example, there may be a case where the processes of steps S104 to S107 are not performed. In this case, while the push-in operation or the pull operation is performed, the first BGM or the second BGM is not added, and only the basic BGM is output. When the push-in operation is detected while the basic BGM is being output, an instrument sound is output only once. This instrument sound may differ in accordance with, for example, the tilt amount or the twist amount.

As described above, in the first game scene, based on the deformation information and the orientation information regarding the ring controller, the filter process, the delay process, the instrument sound addition process, and the like are performed, whereby acoustic effects are applied to the basic BGM. Further, based on the deformation information regarding the ring controller, the first BGM and/or the second BGM as examples of an acoustic effect are added to the basic BGM.

(Game Processing in Second Game Scene)

Figure 35:
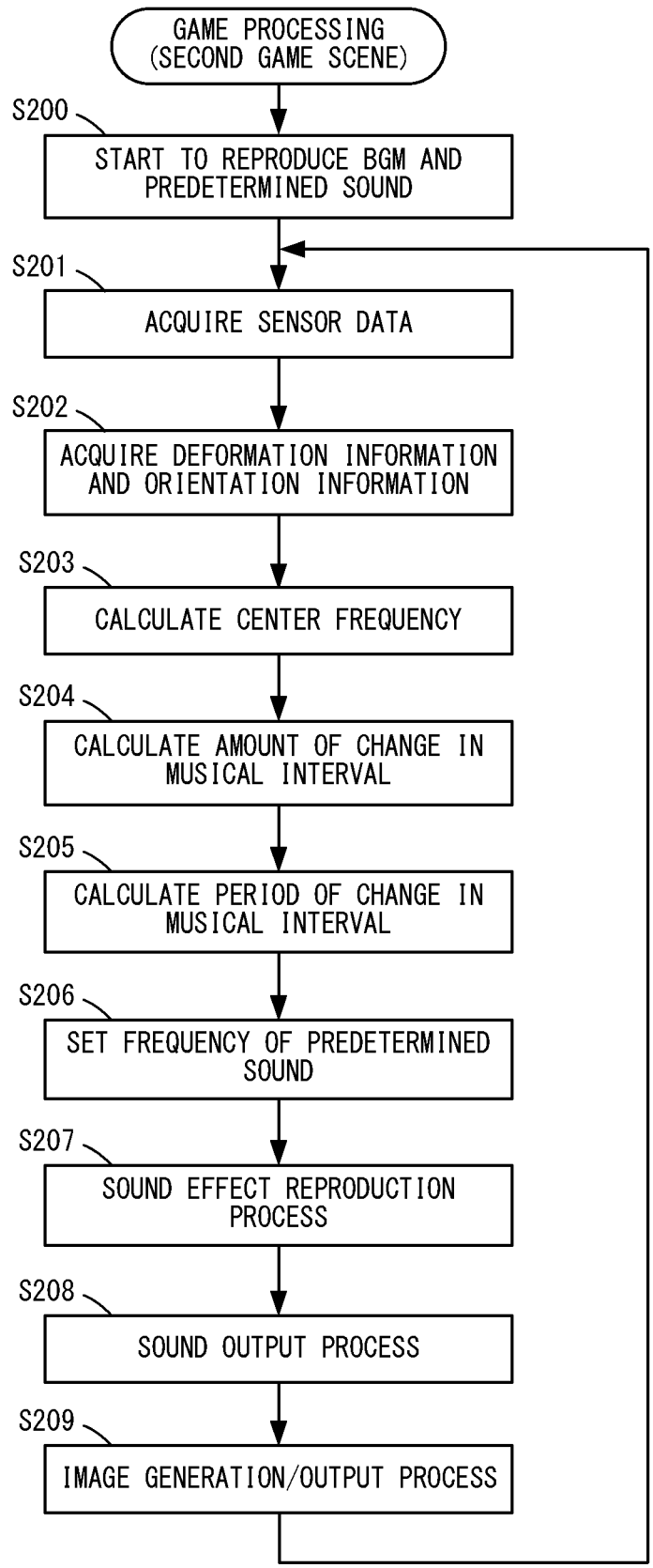
FIG. 35 is a flow chart showing a non-limiting example of game processing in the second game scene performed by the processor 81 of the main body apparatus 2.

Next, game processing in the second game scene is described. FIG. 35 is a flow chart showing an example of the game processing in the second game scene performed by the processor 81 of the main body apparatus 2. The processing shown in FIG. 35 is started in accordance with the fact that the second game scene is started during the execution of the game.

As shown in FIG. 35, first, the processor 81 starts to reproduce BGM and a predetermined sound (step S200). The BGM to be reproduced here is music different from the pieces of BGM in the first game scene. Further, the predetermined sound is a sound composed of a frequency component or a plurality of frequency components.

Next, the processor 81 acquires sensor data from the ring controller (step S201) and acquires deformation information and orientation information regarding the ring controller (step S202). The processes of steps S201 and S202 are processes similar to those of steps S101 and S102, and therefore are not described in detail.

Next, the processor 81 calculates the center frequency of the predetermined sound based on the deformation information (step S203). Specifically, based on the deformation information, the processor 81 determines whether or not a pull operation is performed on the ring controller. When the pull operation is performed, the processor 81 sets the center frequency in accordance with the pull amount. The center frequency is set such that the greater the pull amount, the smaller the center frequency.

Subsequently, the processor 81 calculates a parameter regarding the amount of change in the musical interval based on the deformation information and the orientation information (step S204). The parameter regarding the amount of change in the musical interval is a parameter indicating how much (how many times) the frequency of the predetermined sound is moved up and down from the center frequency. The parameter regarding the amount of change in the musical interval is a parameter that changes in the range of 0 to 3, for example. Specifically, the processor 81 calculates the sum of the absolute value of the pull amount, the absolute value of the tilt amount, and the absolute value of the twist amount and calculates the parameter regarding the amount of change in the musical interval based on this sum.

Next, the processor 81 calculates the period of change in the musical interval based on the deformation information and the orientation information (step S205). The period of change in the musical interval is a parameter indicating the period of changing the frequency of the predetermined sound and changes in the range of 0.5 to 10 seconds, for example. Specifically, the processor 81 calculates the sum of the absolute value of the tilt amount and the absolute value of the twist amount, calculates the product of this sum and the absolute value of the pull amount, and calculates the period of change in the musical interval based on the product.

Next, the processor 81 sets the frequency of the predetermined sound based on the center frequency, the amount of change in the musical interval, and the period of change in the musical interval (step S206). The frequency at each time is set in step S206, whereby the frequency of the predetermined sound periodically changes in accordance with the lapse of time (see FIGS. 25 and 26).

Next, when the pull operation is detected, the processor 81 executes a sound effect reproduction process (step S207). Specifically, when the pull operation is detected, the processor 81 reproduces any of a plurality of sound effects in accordance with the twist amount at this time. Further, the processor 81 sets the sound volume of the sound effect in accordance with the pull speed.

Then, the processor 81 performs a sound output process for outputting the BGM, the predetermined sound of which the frequency is set, and the sound effect (step S208) and performs a game image generation/output process (step S209). Consequently, a game image regarding the second game scene is displayed, and a sound corresponding to the operations on the ring controller is also output. After the process of step S209, the processor 81 executes the process of step S201 again. The processes of steps S201 to S209 are repeatedly executed at predetermined frame time intervals until the second game scene ends.

As described above, in the second game scene, based on the deformation information and the orientation information regarding the ring controller, the process of periodically changing the musical interval is performed as an example of an acoustic effect.

As described above, in the exemplary embodiment, by applying a force to the ring controller and also controlling the orientation of the ring controller, it is possible to generate and output various pieces of music.

(Variations)

While the game according to the exemplary embodiment has been described above, the above exemplary embodiment is merely an example, and may be modified as follows, for example.

For example, in the above exemplary embodiment, the right controller 4 including a sensor for detecting the orientation of the right controller 4 and the ring-shaped extension apparatus 5 including a sensor for detecting the deformation of the ring-shaped extension apparatus 5 are configured to be separable, and the right controller 4 is attached to the ring-shaped extension apparatus 5, whereby the ring controller including these sensors is configured. In another exemplary embodiment, an input device may be used in which a sensor for detecting the orientation of the input device and a sensor for detecting the deformation of the input device are configured to be inseparable.

Further, in the above exemplary embodiment, the orientation information regarding the ring controller is acquired (calculated) based on output from the inertial sensors (the angular velocity sensor and the acceleration sensor). In another exemplary embodiment, the orientation information regarding the ring controller may be acquired by another method. For example, the orientation information regarding the ring controller may be acquired (calculated) based on an image from a camera. For example, a camera may be provided in the periphery of the ring controller, the ring controller may be captured by the camera, and the orientation of the ring controller may be detected from the captured image. Further, a camera may be provided in the ring controller, and based on an image captured by the camera, the orientation of the ring controller may be detected. That is, the orientation information regarding the ring controller may be acquired (calculated) based on output from the inertial sensors included in the ring controller, or may be acquired (calculated) based on an image from the camera.

Further, in the above exemplary embodiment, an acoustic effect based on the deformation information and the orientation information is applied to basic music, and music to which the acoustic effect is applied is output. In another exemplary embodiment, a basic sound may not exist so long as music is output based on the deformation information and the orientation information. That is, music of only an acoustic effect based on the above deformation information and orientation information (e.g., music obtained by adding an instrument sound to the first BGM) may be output.

Further, in the above exemplary embodiment, when the ring controller is deformed from a steady state, and a parameter regarding the speed of the deformation (e.g., the push-in speed) exceeds a threshold, the sound volume of the first or second BGM is maintained for a predetermined time, thereby providing a reverberation. In another exemplary embodiment, the parameter regarding the speed of the deformation may be the acceleration of the deformation. Further, based on the speed of the deformation not only in a case where the ring controller changes from the steady state to the state where the ring controller is deformed, but also in a case where the ring controller returns from the state where the ring controller is deformed to the steady state, the sound volume of the first or second BGM may be maintained for the predetermined time.

Further, in the above exemplary embodiment, for example, when the ring controller changes from the steady state to the state where the ring controller is pushed in (i.e., changes from the state where the ring controller is not deformed to the state where the ring controller is deformed), an instrument sound is output. In another exemplary embodiment, when the ring controller changes from, for example, the state where the ring controller is pushed in to the steady state (i.e., changes from the state where the ring controller is deformed to the state where the ring controller is not deformed), an instrument sound may be output.

Further, in the above exemplary embodiment, also while the ring controller is not deformed, the first BGM and the second BGM continue to be reproduced, but the sound volumes of the first BGM and the second BGM are set to zero, thereby preventing an acoustic effect from being applied. In another exemplary embodiment, while the ring controller is not deformed, the first BGM and the second BGM may not be reproduced, and only when the ring controller deforms, the first BGM or the second BGM may be reproduced and output, thereby applying an acoustic effect.

Further, in the above exemplary embodiment, in a predetermined game scene, music is output by deforming the ring controller or changing the orientation of the ring controller. In another exemplary embodiment, a music game that advances by deforming the ring controller or changing the orientation of the ring controller may be performed.

For example, the music game may be a game where the user deforms the ring controller or changes the orientation of the ring controller in time with predetermined music, whereby points are added. For example, in the music game, while the predetermined music is output, the user is instructed by an image or a sound to perform an action using the ring controller. When the user performs the action as instructed in a timely manner (at a predetermined timing that matches the rhythm of the music) in accordance with the instruction, points are added in accordance with the degree of coincidence of the timing or whether or not the action is performed as instructed. For example, the action using the ring controller may be the action of deforming (e.g., pushing in or pulling) the ring controller or the action of changing the orientation of the ring controller while deforming the ring controller (e.g., the tilt operation while pushing in the ring controller). Further, the action using the ring controller may be simply the action of changing the orientation of the ring controller (e.g., the twist operation).

In such a music game, the above acoustic effect may be applied in accordance with the action of the user. The acoustic effect to be applied may differ in accordance with the points to be added. For example, when the user performs the tilt operation while performing the push-in operation in time with the predetermined music during the execution of the music game, an acoustic effect based on the push-in amount and the tilt amount may be applied to the predetermined music. For example, based on whether or not this action (the push-in operation and the tilt operation) is performed in a timely manner, the points to be added may differ, or the acoustic effect to be added may differ. For example, when the timing of the action is a timing that matches the rhythm of the predetermined music, an instrument sound corresponding to the tilt amount may be output. When the timing of the action is a timing that does not match the rhythm of the predetermined music, an instrument sound corresponding to the tilt amount may not be output, or a different sound may be output.

Further, the configuration of the game according to the exemplary embodiment system 1 is merely an example, and the above game may be performed in any other configuration. For example, in the above exemplary embodiment, the right controller 4 is attached to the ring-shaped extension apparatus 5, and the left controller 3 is attached to the belt-shaped extension apparatus 6, whereby the ring controller and the leg controller are configured. In another exemplary embodiment, any apparatus may be used so long as the apparatus can detect the exercise of the user. For example, the ring-shaped extension apparatus 5 may have not a circular shape but any shape such as a rod-like shape, an elliptical shape, or an L-shape.

Further, the above game system 1 may include a plurality of apparatuses connected together via a network (a WAN, the Internet, or the like). Further, instead of the main body apparatus 2, any information processing apparatus (e.g., a personal computer, a smartphone, a tablet terminal, a server, or the like) may be used, and an information processing system including this information processing apparatus may be configured.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
    an input device configured to deform from a steady state when a force is applied to the input device, the input device including a sensor for providing output corresponding to the deformation of the input device, and
    at least one processor configured to:
        acquire deformation information corresponding to the deformation of the input device based on the output of the sensor;
        acquire orientation information corresponding to an orientation of the input device; and
        output sound data based on the deformation information and the orientation information.

2. The information processing system according to claim 1, wherein the sound data is obtained by applying a first acoustic effect based on the deformation information and the orientation information to basic sound data.

3. The information processing system according to claim 2, wherein a second acoustic effect based on the deformation information is further applied to the sound data.

4. The information processing system according to claim 3, wherein a third acoustic effect based on the orientation information is applied to the second acoustic effect.

5. The information processing system according to claim 3, wherein while the input device is deformed, the second acoustic effect is continuously applied.

6. The information processing system according to claim 5, wherein the greater a deformation amount of the input device, the greater the second acoustic effect.

7. The information processing system according to claim 6, wherein in a case where the input device deforms at a speed greater than a threshold, and when the input device returns from the deformed state to the steady state, a decrease in the second acoustic effect is slower than in a case where the input device deforms at a speed smaller than the threshold.

8. The information processing system according to claim 5, wherein in accordance with the deformation of the input device from the steady state, a fourth acoustic effect is further applied to the sound data.

9. The information processing system according to claim 8, wherein the fourth acoustic effect is based on the orientation of the input device when the input device is deformed from the steady state.

10. The information processing system according to claim 2, wherein:
    the at least one processor is further configured to detect that the input device is swung, and
    when the input device is swung, a fifth acoustic effect based on the orientation information is further applied to the sound data.

11. The information processing system according to claim 2, wherein:
    the input device undergoes a first deformation when a force in a first direction is applied to the input device and undergoes a second deformation when a force in a second direction different from the first direction is applied to the input device, and
    the first acoustic effect applied based on the first deformation is different from the first acoustic effect applied based on the second deformation.

12. The information processing system according to claim 1, wherein:
    when the input device deforms from the steady state, the sound data obtained by applying an acoustic effect corresponding to the orientation information is output, and
    when the input device is in the steady state, the sound data obtained without applying the acoustic effect corresponding to the orientation information is output.

13. The information processing system according to claim 2, wherein:
    when the input device deforms from the steady state, the sound data obtained by applying an acoustic effect corresponding to the orientation information to the basic sound data is output, and
    when the input device is in the steady state, the basic sound data is output regardless of the orientation information.

14. The information processing system according to claim 1, wherein the input device includes a ring-shaped portion, at least part of which can elastically deform.

15. The information processing system according to claim 1, wherein:
    the input device is handheld,
    the information processing system further comprises a second input device configured to detect a motion of a leg of a user holding the input device, and the sound data is output further based on a detection result of the motion of the leg of the user in addition to the deformation information and the orientation information.

16. The information processing system according to claim 1, wherein the sound data is output based on a product of the deformation information and the orientation information.

17. A non-transitory storage medium having stored therein an information processing program executed by a processor of an information processing apparatus configured to connect to an input device that deforms from a steady state when a force is applied to the input device, the information processing program causing the processor to execute operations comprising:
   acquiring deformation information corresponding to the deformation of the input device based on output from a sensor for detecting the deformation of the input device;
   acquiring orientation information corresponding to an orientation of the input device; and
   outputting sound data based on the deformation information and the orientation information.

18. An information processing apparatus configured to connect to an input device that deforms from a steady state when a force is applied to the input device, the information processing apparatus comprising at least one processor configured to:
   acquire deformation information corresponding to the deformation of the input device based on output from a sensor for detecting the deformation of the input device;
   acquire orientation information corresponding to an orientation of the input device; and
   output sound data based on the deformation information and the orientation information.

19. An information processing method executed by an information processing system including at least one processor and an input device that deforms from a steady state in response to a force being applied to the input device, the information processing method comprising:
   acquiring deformation information corresponding to the deformation of the input device based on output from a sensor for detecting the deformation of the input device;
   acquiring orientation information corresponding to an orientation of the input device; and
   outputting, by the at least one processor, sound data based on the deformation information and the orientation information.

20. The information processing method according to claim 19, further comprising obtaining the sound data by applying a first acoustic effect based on the deformation information and the orientation information to basic sound data.

* * * * *